(12) United States Patent
Rowstron et al.

(10) Patent No.: US 8,375,141 B2
(45) Date of Patent: Feb. 12, 2013

(54) INFRASTRUCTURE TO DISSEMINATE QUERIES AND PROVIDE QUERY RESULTS

(75) Inventors: Antony Rowstron, Cambridgeshire (GB); Richard Mortier, Cambridge (GB); Austin Donnelly, Cambridgeshire (GB); Dushyanth Narayanan, Cambridgeshire (GB)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 11/537,476

(22) Filed: Sep. 29, 2006

(65) Prior Publication Data

US 2008/0082628 A1 Apr. 3, 2008

(51) Int. Cl.
*G06F 15/173* (2006.01)
(52) U.S. Cl. .................... 709/238; 709/240; 709/241
(58) Field of Classification Search ................ 709/238, 709/240, 241
See application file for complete search history.

(56) References Cited

U.S. PATENT DOCUMENTS

| | | | |
|---|---|---|---|
| 6,014,712 A | 1/2000 | Islam et al. | |
| 6,076,087 A | 6/2000 | Suciu | |
| 6,108,782 A | 8/2000 | Fletcher et al. | |
| 6,947,984 B2 | 9/2005 | Schweitzer et al. | |
| 6,961,728 B2 * | 11/2005 | Wynblatt et al. | 707/10 |
| 6,973,491 B1 | 12/2005 | Staveley et al. | |
| 2004/0111410 A1 | 6/2004 | Burgoon et al. | |
| 2004/0153458 A1 * | 8/2004 | Noble et al. | 707/10 |
| 2005/0108203 A1 * | 5/2005 | Tang et al. | 707/3 |
| 2005/0243740 A1 * | 11/2005 | Chen et al. | 370/256 |
| 2005/0262045 A1 | 11/2005 | Tsuchida et al. | |
| 2006/0041658 A1 | 2/2006 | Nelson et al. | |
| 2006/0047786 A1 | 3/2006 | Doi | |
| 2007/0174246 A1 * | 7/2007 | Sigurdsson et al. | 707/3 |

OTHER PUBLICATIONS

Rowstron, A., and Druschel, P. Pastry: Scalable, decentralized object location and routing for large-scale peer-to-peer systems. Microsoft Research Ltd [online], Nov. 2001 [retrieved on Feb. 6, 2009]. Retrieved from the Internet:<URL:http://research.microsoft.com/en-us/um/people/antr/past/pastry.pdf>.*
Bernardino, J. et al. Approximate Query Answering Using Data Warehouse Striping. Journal of Intelligent Information Systems [online], Sep. 2002 [retrieved Feb. 7, 2010]. Retrieved from Internet:<URL: http://www.springerlink.com/content/m216155r6x0h2751/fulltext.pdf>.*
Aberer, K. et al., "Indexing data-oriented overlay networks", in VLDB, pp. 685-696, Trondheim, Norway, Aug. 2005, 12 pages.
Avnur, R. et al., "Eddies: Continuously adaptive query processing", In SIGMOD, pp. 261-272, Dallas, TX, May 2000,12 pages.
Balazinska, M. et al., "Fault-tolerance in the Borealis distributed stream processing system", In SIGMOD, pp. 13-24, Baltimore, MD, Jun. 2005, 12 pages.

(Continued)

*Primary Examiner* — Tonia L Dollinger
*Assistant Examiner* — Adam Cooney
(74) *Attorney, Agent, or Firm* — Zete Law, P.L.L.C.; MacLane C. Key

(57) ABSTRACT

Methods of querying a large number of endsystems are described in which metadata is replicated between endsystems. When a query is injected, an available endsystem receives a message relating to the query which identifies a range of endsystems for which that available endsystem is responsible. The available endsystem then generates completeness data for the range of endsystems based on data stored at the endsystem and this completeness data is transmitted to the sender of the message. The methods may be implemented using device-executable instructions which may be stored on device readable media.

17 Claims, 16 Drawing Sheets

OTHER PUBLICATIONS

Bharambe, A. R. at al., "Mercury: supporting scalable multi-attribute range queries", In SIGCOMM, pp. 353-366, Portland, OR, Aug. 2004, 14 pages.
Castro, M. et al., "Performance and dependability of structured peer-to-peer overlays", In DSN, pp. 9-18, Florence, Italy, Jun. 2004, 14 pages.
Chen. J., et al., "NiagaraCQ: A scalable continuous query system for Internet databases", In SIGMOD, pp. 379-390, Dallas, TX, May 2000, 12 pages.
Cheng, R. et al., "Efficient indexing methods for probabilistic threshold queries over uncertain data", In VLDB, pp. 876-887, Toronto, CN, Aug. 2004, 12 pages.
Deshpande, A. et al., "Lifting the burden of history from adaptive query processing", In VLDB, pp. 948-959, Toronto, CN, Aug. 2004, 12 pages.
Hellerstein, J.M. et al., "Online aggregation", In SIGMOD, pp. 171-182, Tucson, AZ, May 1997, 12 pages.
Huebsch, R., et al., "Querying the Internet with PIER", In Proc. International Conference on Very Large Data Bases (VLDB), Berlin, Germany, Sep. 2003, 12 pages.
Jagadish, H.V. et al., "BATON: A balanced tree structure for peer-to-peer networks", In VLDB, pp. 661-672, Trondheim, Norway, 2005, 12 pages.
Johnson, T. et al., "Lazy updates for distributed search structure", In Proc. ACM SIGMOD International Conference on Management of Data, New York, NY, USA, 1993, ACM Press, 21 pages.
Litwin, W. et al., "RP: A family of order preserving scalable distributed data structures", In VLDB, pp. 342-353, Santiago de Chile, Chile, Sep. 1994, 12 pages.
Loannidis, Y.E. et al., "Histogram-based approximation of set-valued query-answers", In VLDB, pp. 174-185, Edinburgh, UK, Sep. 1999, 12 pages.
Lomet, D., "Replicated indexes for distributed data", In Proc. International Conference on Parallel and Distributed Information Systems (PDIS), Miami Beach, FL, USA, 1996, 12 pages.
Loo, B. T. et al., "Enhancing P2P file-sharing with an internet-scale query processor", In VLDB, pp. 432-443, Toronto, CN, Aug. 2004, 12 pages.
Madden, S. et al., "Continuously adaptive continuous queries over streams", In SIGMOD, pp. 49-60, Madison, WI, Jun. 2002. ACM, 12 pages.
Madden, S. at al., "TAG: A Tiny AGgregation service for ad-hoc sensor networks", In Proc. Symposium on Operating Systems Design and Implementation (OSDI), Boston, MA, Dec. 2002, 14 pages.
Mickens, J.W. at al., "Exploiting availability prediction in distributed systems", In NSDI (to appear), San Jose, CA, May 2006, 14 pages.
Mortier, R. et al., "Seaweed: Distributed Scalable Ad Hoc Querying", 6 pages.
Pietzuch, P. et al., "Network-aware operator placement for stream-processing systems", In Proc. International Conference on Data Engineering (ICDE) (to appear), Atlanta, GA, USA, Apr. 2006, 12 pages.
Rowstron, A. et al., "Pastry: Scalable, distributed object location and routing for large-scale peer-to-peer systems", In Middleware, pp. 329-350, Nov. 2001.
Shneidman, J. et al., "A cost-space approach to distributed query optimization in stream based overlays", In Proc. IEEE International Workshop on Networking Meets Databases (NetDB 2005), Tokyo, Japan, Apr. 2005, 5 pages.
Tian, F. et al., "Tuple routing strategies for distributed eddies", In VLDB, pp. 333-344, Berlin, Germany, Sep. 2003.
Van Renesse, R. et al., "Astrolabe: A Robust and Scalable Technology for Distributed System Monitoring, Management, and Data Mining", ACM Transactions on Computer Systems, vol. 21, No. 2, May 2003, pp. 164-206.
Yalagandula, P. et al., "A Scalable Distributed Information Management System", SIGCOMM 2004, 12 pages.

\* cited by examiner

US 8,375,141 B2

INFRASTRUCTURE TO DISSEMINATE QUERIES AND PROVIDE QUERY RESULTS

BACKGROUND

Many applications are emerging where it is necessary to query large, structured, highly distributed datasets, such as in managing a wide-area network comprising a large number of computers, where each computer holds a subset of the data and may regularly update this locally stored data. In such large systems, the total amount of data may be very large (e.g. many TeraBytes of data distributed over 100,000+ geographically distributed computers) and a significant fraction of the computers (and hence the data) may be unavailable at any given time. Current solutions enable the dataset to be queried by replicating the data at one or more nodes and then querying this consolidated dataset. However, this is infeasible for very large datasets because it creates huge network overheads due to the transfer of the data to the central node(s).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of querying a large number of endsystems are described in which metadata is replicated between endsystems. When a query is injected, an available endsystem receives a message relating to the query which identifies a range of endsystems for which that available endsystem is responsible. The available endsystem then generates completeness data for the range of endsystems based on data stored at the endsystem and this completeness data is transmitted to the sender of the message. The methods may be implemented using device-executable instructions which may be stored on device-readable media.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
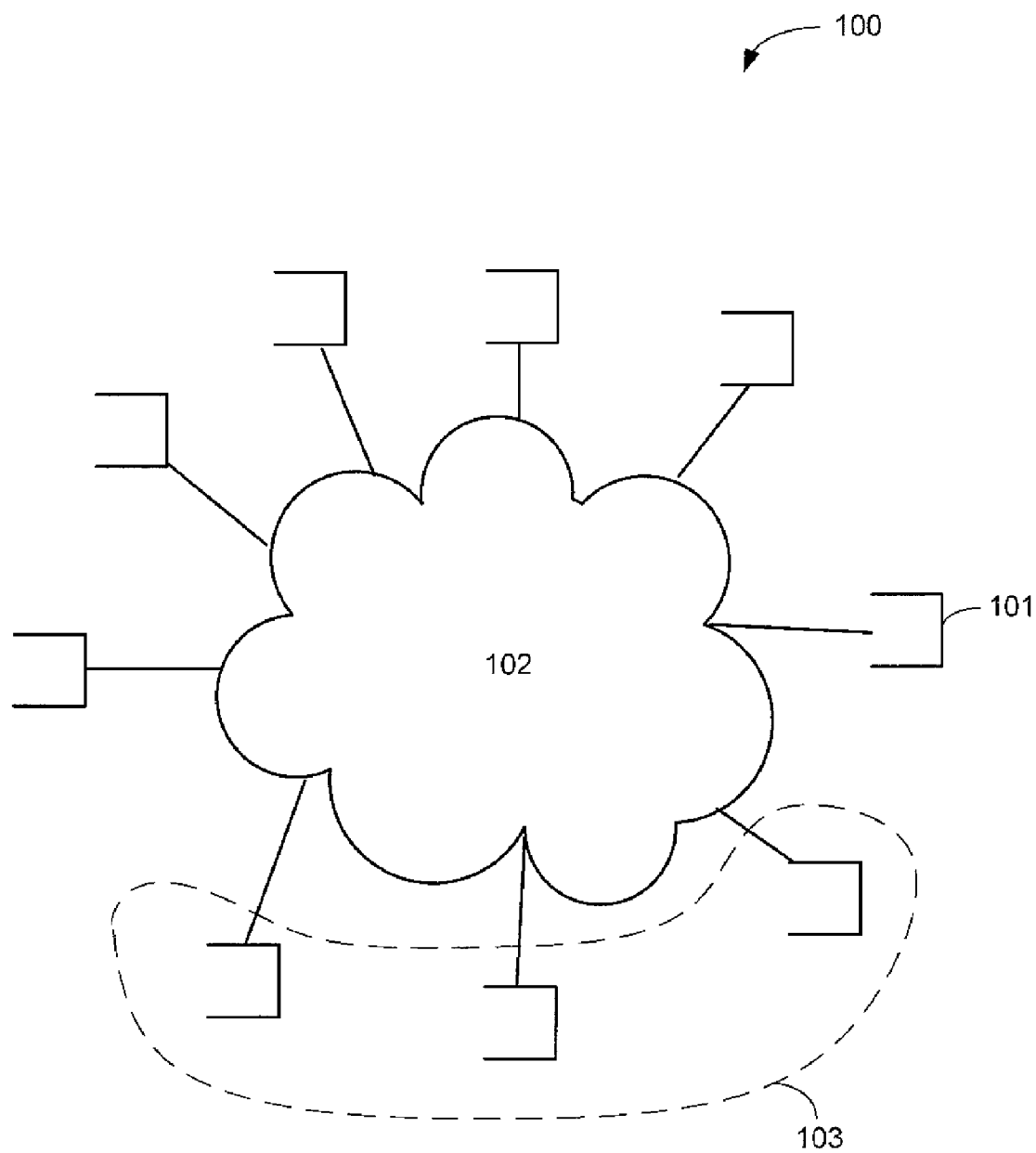
FIG. 1 is a schematic diagram of a system comprising a large number of endsystems.

FIG. 1 is a schematic diagram of a system 100 comprising a large number of endsystems 101 connected via a network 102 (such as the internet). It will be appreciated that while, for explanation purposes, FIG. 1 shows only nine endsystems, such systems may contain very large numbers of endsystems (e.g. $10^3$ to $10^9$ systems). Each endsystem 101 (which may be a computer) has stored data and this data may be generated by the endsystem and may be regularly updated by the endsystem. The endsystem may also be able to query this locally stored data. In addition to storing this data locally, each endsystem replicates a small amount of data, referred to as 'metadata' on a number, k, of other endsystems. The metadata is described in more detail below. A particular endsystem and the k other endsystems on which its metadata is replicated is referred to as a 'replica set' 103 (with k=2 in FIG. 1). Although in FIG. 1, the members of the replica set are shown as being geographically close to each other, this is by way of explanation only and the members of the replica set may be selected by other means such that they may be geographically distributed.

Figure 2:
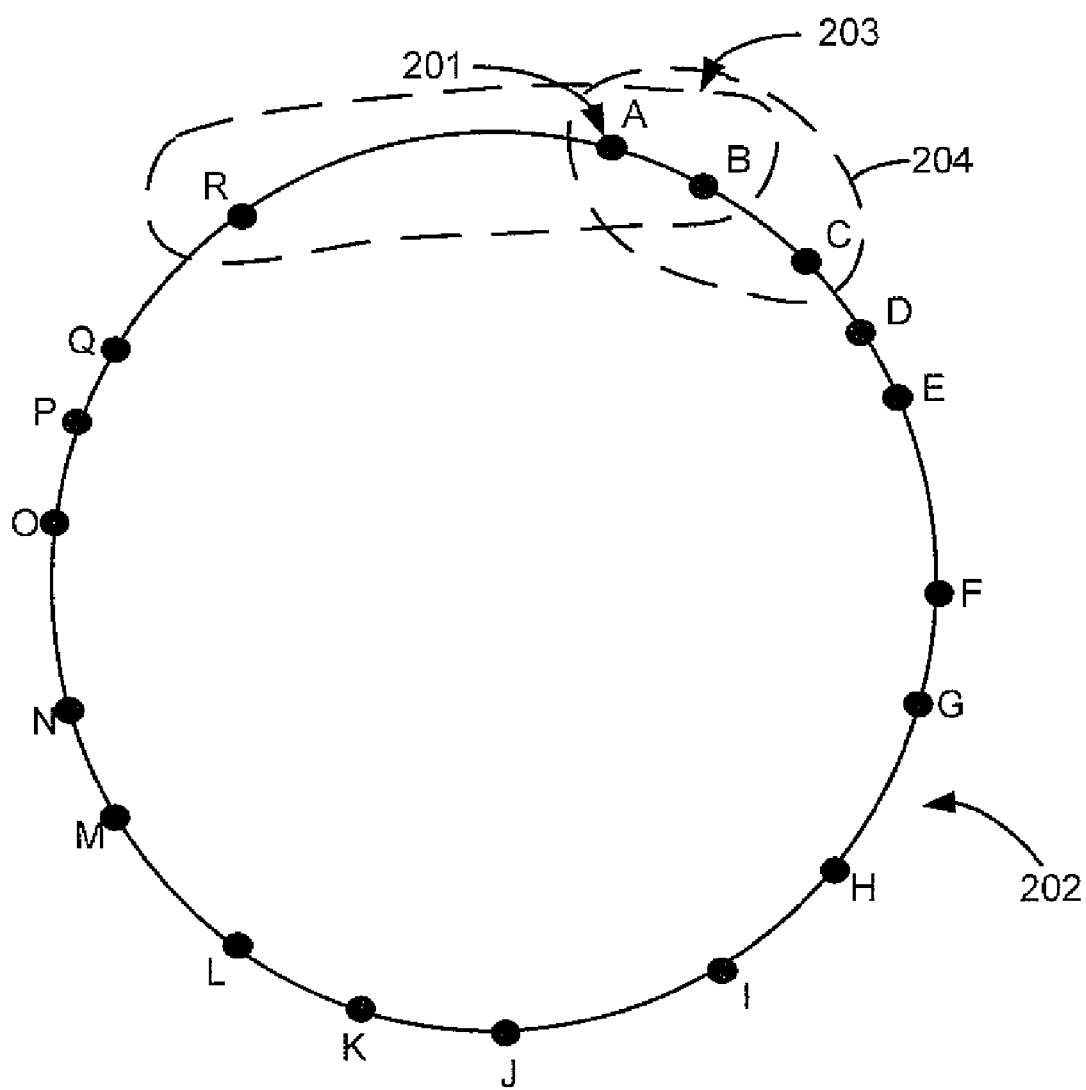
FIG. 2 shows a schematic diagram of a number of endsystems in a circular namespace.
Figure 3:
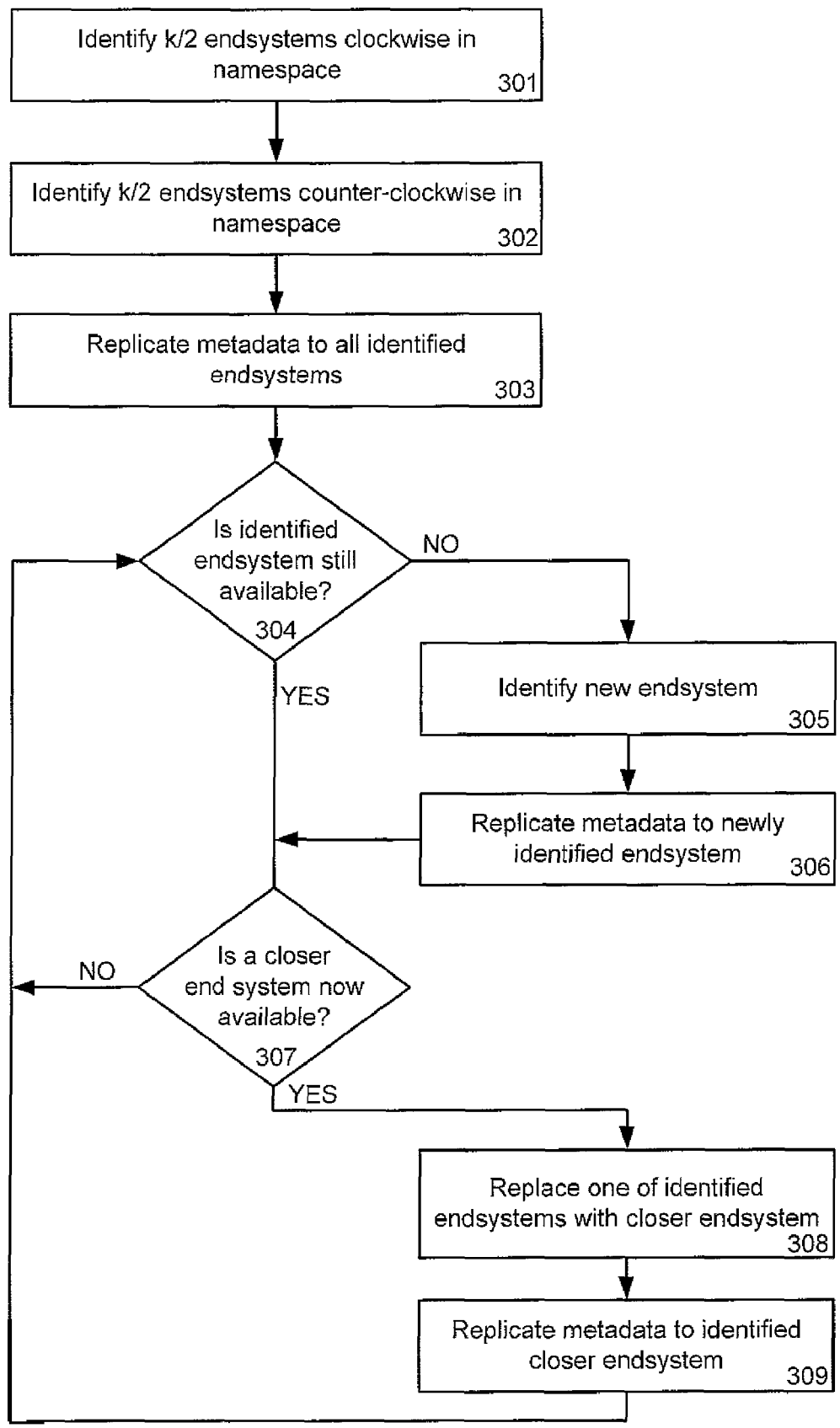
FIG. 3 shows an example flow diagram of the operation of an endsystem.

Each endsystem may be assigned an identifier (referred to as an 'endsystem ID') from a large sparse wrapped namespace and the endsystem IDs may be used to determine members of a replica set. FIG. 2 shows a schematic diagram of a number of endsystems 201 arranged by endsystem ID in the circular namespace 202. For purposes of explanation, the endsystems are labeled A-R. In an example where k=2, endsystem A has a replica set 203 containing itself (A) and the two endsystems which are either side of it in the namespace (endsystems R and B). Similarly, endsystem B has a replica set 204 containing itself (B), the k/2 neighboring endsystems clockwise in the namespace (C) and the k/2 neighboring endsystems counter-clockwise in the namespace (A). FIG. 3 shows an example flow diagram of the operation of an endsystem which (when it joins or rejoins the system) identifies the k/2 closest endsystems clockwise in the namespace (step 301) and the k/2 closest endsystems counter-clockwise in the namespace (step 302). The endsystem then replicates (or pushes) its metadata to these k identified endsystems (step 303). Where k is an odd number, the replica set will still contain k+1 endsystems, but the selected number of neighboring systems clockwise and counter-clockwise within the name space will differ by a maximum of one (e.g. for k=5, the three closest endsystems in a clockwise direction and the two closest endsystems in a counter-clockwise direction may be selected).

In order to maintain the number of replicas equal to the value of k, if one of the members of a replica set becomes unavailable (identified in step 304), a new member of the replica set may be identified (step 305) and the metadata be replicated to that new member (step 306). In the example shown in FIG. 2, if endsystem R becomes unavailable, endsystem A identifies the new neighboring endsystem counter-clockwise in the namespace, Q, and replicates its metadata to endsystem Q, such that there remains k+1 copies of A's metadata, held at endsystems Q, A and B (i.e. k replicas, held at Q and B and one original held at A). In order that endsystems are aware of the availability of other endsystems which are close to it in the namespace, endsystems may send out periodic signals (e.g. every 30 seconds) to nearby endsystems (in the namespace). If an endsystem fails to receive such a periodic signal from a member of its replica set (identified in step 304), the endsystem may then identify a new member of the replica set.

If endsystem A itself becomes unavailable, the closest node in namespace becomes responsible for A's metadata, and thus re-replicates it. If A returns, the farthest node in the namespace from A will drop out of A's replica set and may or may not delete its replica of A's metadata either immediately or at some future time (as described below).

Figure 4:
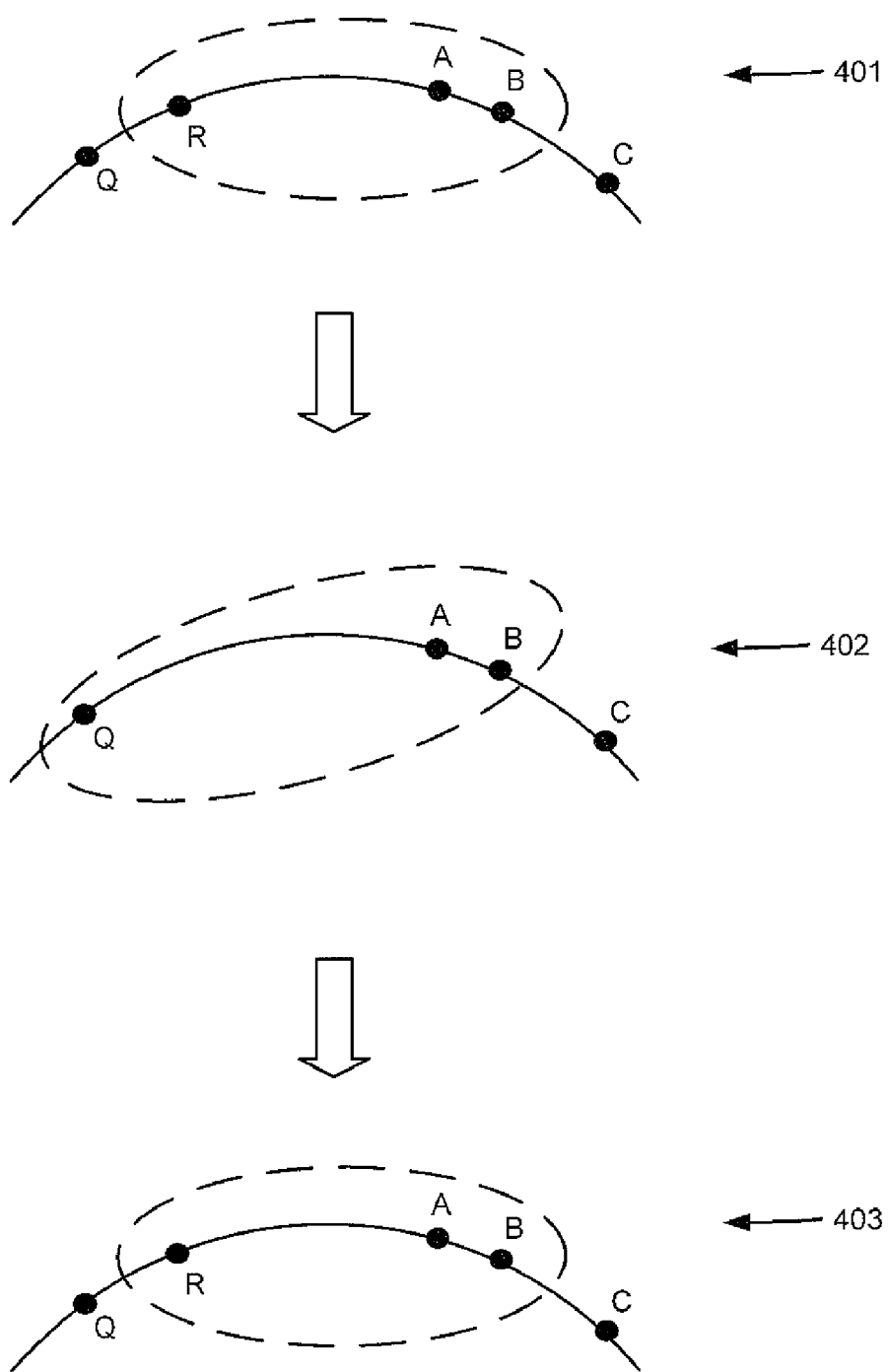
FIG. 4 shows schematic diagrams of a number of endsystems in a circular namespace.

In addition to endsystems becoming unavailable, endsystems may also become available, for example when new endsystems are added to a system or following a period of unavailability. In order to maintain the optimum replica set, an endsystem may monitor when a new endsystem which is close in namespace becomes available (e.g. by receipt of a periodic signal, as described above) and then re-assess the members of its replica set (step 307), as shown in FIG. 3. If an endsystem becomes available which is closer either in a clockwise or counter-clockwise direction within the namespace than an existing member of the replica set in the same direction, then the endsystem which has become available may replace that existing member (i.e. that member which is furthest in namespace in the same direction) of the replica set (step 308) and the endsystem replicates its metadata to the new member of the replica set (step 309). In an example, as shown in FIG. 4, where k=2, the replica set associated with endsystem A comprises endsystems R, A and B, in a first scenario 401. If endsystem R becomes unavailable (as shown in scenario 402), then endsystem Q joins endsystem A's replica set because Q is closest to A in a counter-clockwise direction. If endsystem R subsequently becomes available again (as shown in scenario 403), then endsystem R replaces endsystem Q in A's replica set because it is the closest available (or live) endsystem to A in a counter-clockwise direction.

When an endsystem is discarded from a replica set (e.g. Q in the example shown in FIG. 4), the endsystem may discard the metadata related to the replica group (e.g. the metadata associated with endsystem A) or the endsystem may retain the metadata for a period of time (or indefinitely). By retaining the metadata, it may result in reduced transfer of data between systems and hence reduced system overhead, should the endsystem become part of the replica set again (e.g. if R becomes unavailable again). In such a situation, it may not be necessary to send the metadata again (from A to Q) or only the changes may be sent.

In addition to or instead of selecting members of a replica set based on endsystem ID, members of a replica set may be selected based on availability information (as described in more detail below). In such a method available endsystems may not be selected for a replica set where the availability data predicts that they will shortly become unavailable.

In addition to or instead of selecting members of a replica set based on endsystem ID and/or availability information, members may be selected based on information maintained by an overlay network (as described below). By using an overlay network members of a replica set may be selected so that messages may be sent to them directly (e.g. in a single hop). An overlay network may be similarly used at any point in the methods described herein where a selection of an endsystem occurs.

Although the above description describes the number of endsystems within a replica set being maintained as a constant value, in another example the number of endsystems within a replica set may be defined as a range. For example, a target number of endsystems may be defined (e.g. k=4) and a minimum number of endsystems within a replica set may also be defined (e.g. min=4). In such an example, the metadata may initially be replicated to the target number of endsystems (e.g. to 4 other endsystems in steps 301-303 such that the replica set contains 5 endsystems) but additional endsystems may only be identified (in step 305) when the number of endsystems within the replica set falls below the minimum (e.g. less than 4 in total, including the originating endsystem). In addition to, or instead of, defining a minimum number of endsystems, a maximum number of endsystems in a replica set may be defined (e.g. max=6). In such an example, additional closer endsystems which become available may be added to the replica set (steps 307 and 309) without replacing existing endsystems (step 308) until the maximum is reached. Use of a range (e.g. target, minimum and/or maximum values) may reduce the system overhead where there is a large amount of churn in the system (e.g. where a large proportion of the endsystems are frequently becoming available/unavailable). In another example, the value of k may be varied according to network conditions or other parameters, e.g. as the rate of churn within the network increases, the value of k may be increased.

After initially replicating the metadata to endsystems within the replica set, the originating endsystem (e.g. endsystem A in the examples above) may also update the metadata stored at the endsystems within the replica set. This may be done by resending some/all of the metadata to the members of the replica set or by sending data relating to the changes in metadata so that the metadata may be updated by the members of the replica set. By only communicating changes in metadata the system overhead is reduced. The updating of metadata may occur whenever a change in data at the originating endsystem occurs or periodically. As described below, the metadata may contain several different parts (e.g. a data summary and an availability model) and different parts may be updated at different times and/or with different periodicity. For example, the data summary may be updated regularly (e.g. every hour) whilst the availability model may be updated less often (e.g. every week). In an example, the metadata may be pushed to members of the replica set with an average period of 17.5 minutes, with each endsystem choosing its push time (to its replica set) randomly, so as to avoid spikes in network bandwidth. In another example, the push rate (i.e. the regularity with which the replicated data is resent) may be varied, e.g. according to the data change rate. The replication frequency may be dependent upon the application of the system.

Instead of using a push model to update metadata stored at endsystems within the replica set (as described above), a polling or pull model may alternatively be used, or a combination of push and pull models may be used. In a pull model, replicas request updated metadata from the originating endsystem. As with the push model, the pull time may be selected randomly to avoid spikes in network bandwidth.

The metadata which is replicated by an endsystem to members of its replica set is much smaller in size (e.g. orders of magnitude smaller) than the amount of data held at each endsystem. The metadata may include one or more of the following:

Data summary: this provides a compact representation of the data held at the endsystem Availability model: this provides information on the past availability/unavailability of the endsystem Load profile: this provides information on the latency of query execution at the endsystem Local scheduling policy: this provides information on any scheduling policy adopted at the endsystem which may impact query execution at the endsystem Local security/access policies: these specify which data can be queried by which query issuer.

These items are described in more detail below.

In an example implementation, the metadata may comprise the data summary and the availability model. In other example implementations one or more of the load profile, local scheduling policy and local security/access policies may be included within the metadata dependent upon how query scheduling is to be performed.

The data summary provides a compact representation of the data held at the endsystem and may comprise one or more distribution histograms on specified attributes of the local data. The set of specified attributes (also referred to as 'indexed attributes') may be specific to the application of the system. In other examples, the data summary may comprise a subset of the data held at the endsystem or values derived from the data held at the endsystem (e.g. a mathematical best fit function of the data). In other examples the data summary may comprise wavelets or views instead of histograms. The use of the data summary is described below.

The availability model provides information on the past availability/unavailability of the endsystem and enables the recipient endsystem to predict the availability of an endsystem (e.g. a currently unavailable endsystem). Data relating to when a particular endsystem goes up (i.e. becomes available) and down (i.e. becomes unavailable) is monitored by that endsystem (i.e. it detects its own availability, e.g. when it reboots or returns from an unexpected outage). Prediction algorithms may then be used to convert the historical information into predictions of when an endsystem will next come up (i.e. become available). A number of different prediction methods may be used and examples are described below. Use of the availability model in responding to a query is also described below. The availability model may be updated periodically, for example, each time the endsystem becomes available after a period of unavailability.

The availability model is sent out by an endsystem to members of its replica set (e.g. within the metadata, as described above). Members of the replica set monitor the availability of the originating endsystem and may update their local copy of the originating endsystem's availability model when the replica notices that the originating endsystem has become unavailable such that the local copy of the model includes the time that the endsystem became unavailable. This local copy may be overwritten when an updated copy of the availability model is obtained (e.g. via push or pull) from the originating endsystem.

A first example of a prediction method uses downtime distributions. The length of down times (i.e. the amount of time for which an endsystem remains unavailable) is modeled as a probability distribution ($p_{down}$). Given a downtime distribution $p_{down}$ and the "current down time" $T_{down}$ it is possible to predict the remaining down time in different ways. The distribution may first be converted in to a truncated distribution $p'_{down}$, which is the portion of $p_{down}$ to the right of $T_{down}$ renormalized to have a total probability of 1. The mean of the truncated distribution is then the expected remaining down time. By converting the truncated distribution to a cumulative distribution $c'_{down}$ it is also possible to estimate percentiles, i.e. the remaining time until there is a probability P (e.g. 95%) that the endsystem will have come up by that time.

Downtime probability distributions may be maintained as histograms, where each downtime length (or range of lengths) has an associated count. The scale of the histogram may be linear (all buckets are equal-sized) but in many cases a log scale (where bucket sizes increase exponentially) may be more appropriate. Alternatively the probability distributions may be modeled by fitting the observed downtime values to an analytic probability distribution function such as exponential, Pareto, Gaussian, or Weibull or as an arbitrary weighted mix of multiple analytic curves.

A second example of a prediction model uses up-event periodicity. The time of day (and in some examples the day of the week) at which an endsystem tends to come up is modeled. For example, where an endsystem is a desktop computer, it may have a regular pattern of being switched on in the morning e.g. when the user comes to work. Based on information on this periodic performance of an endsystem, predictions can be made when an unavailable endsystem is likely to come up next (e.g. it is likely to come up at around 9.30 am). In an example, one count per endsystem per hour of day may be maintained which records the number of times that the endsystem was observed to come up during that hour in the past. Normalizing this data provides a per-endsystem probability distribution for up events by hour of day. As the systems may span a large geographic area, the generation of the probability distribution may also include adjustment to take into consideration the different time zones in which different endsystems may be situated. Since weekend patterns are often different from weekday ones, two 24-hour histograms, one for the working week (erg. Monday-Friday, dependent upon local customs and cultures) and another for weekends (e.g. Saturdays/Sundays), may be maintained for each endsystem, however large amounts of training data may be required to identify such effects. It will be appreciated that dependent upon the results observed within a system, different numbers of histograms for different periods of time may be appropriate.

There are multiple ways to use the up-event distributions for predictions. The simplest is to use the "next mode" method. In this method, the peak (i.e. the mode) of the distribution is observed and it is assumed that the endsystem, if currently down, will always come up at that time. So if, in an example, the endsystem is currently down (where the current time is 10 pm) and the mode for that endsystem is at 9 am, a further downtime of 11 hours would be predicted. A second method of using the up-event distributions uses a "staircase" predictor. This looks at each hour in the future independently and estimates the probability that the endsystem will come up first in that hour, i.e. the probability that there was an up-event in that hour multiplied by the probability that there was no up-event in any preceding hour. This staircase predictor method can deal with multiple modes and other cases where there is no clearly defined mode (unlike the simple method described above). However, it treats each hour slot as independent of the next which is unlikely to be the case, because in reality endsystems that often come up at 9 am are more likely to come up at 10 am than at 3 pm. This "correlation" effect may be added by first smoothing the histogram, e.g. using a Gaussian kernel.

A third example of a prediction model is a hybrid model which incorporates both downtime and up event distributions (as described above). According to this example, endsystems are first classified as periodic or non-periodic according to the "peakiness" of their up-event distribution, i.e. if the peak-mean ratio of the up-event distribution exceeds some threshold (e.g. a threshold of 2), then the endsystem is classified as periodic, otherwise it is classified as non-periodic. Periodic endsystems are predicted using the "next mode" method on the up-event distribution (see the second example method above) whilst non-periodic endsystems are predicted using the truncated downtime distribution method, with a log-scale histogram representation (see the first example method above).

A fourth example of a prediction model is a second hybrid model which uses "weighted mix models". Instead of classifying endsystems as periodic or non-periodic, each endsystem has a set of weights, and the input of any particular model into predictions for that endsystem depends on the weights. For example, models involving any combinations of downtime/up-event, histogram/analytical, and per-endsystem/global models may be mixed. Whilst a more diverse mix can capture a larger set of effects, it is computationally more expensive to train, requires more data to train and is more susceptible to overfitting.

Although the above description relates to modeling the length of downtime and the times of up-events, the same techniques may be used to model lengths of uptime and the times of down-events. This information may be included within the availability model and may be used in the selection of members of a replica set (e.g. to pick more reliable endsystems).

The load profile provides information on the latency of query execution at the endsystem and interacts with the local scheduling policy (described below). The load profile may inform the expected running time of the query and/or the expected start time of the query. In an example the load profile may be based on historical load data e.g. represented as an expected load average over a 24 hour period.

The local scheduling policy provides information on any scheduling policy adopted at the endsystem which may impact query execution at the endsystem. For example, under certain policies, query execution may be delayed on an available endsystem.

The load profile and/or the local scheduling policy may be useful because in many examples the queries (and the rest of the method steps described below) may be run as background processes on endsystems. Therefore if the endsystem is heavily loaded on a higher priority process there may be considerable delay in executing a query at that endsystem. By sharing this information on loading and/or scheduling in the metadata, this information can be taken into consideration when generating completeness predictors, as described below.

Whilst the description herein refers to replication of the metadata, different parts of the metadata (e.g. the data summary and the availability model) may be replicated in different ways. For example, different replica sets may be selected, different values of k may be used etc.

The network overhead of the scalable query infrastructure and querying methods described herein are driven by the replication of metadata. The overhead also depends on the replication factor k. When an endsystem fails, the metadata stored by it may be replicated on some other endsystem to maintain k replicas (as described above). If all k replicas fail during the window of vulnerability between failure detection and re-replication, the metadata will become unavailable. Thus the choice of k is a trade-off between overhead and availability, and depends on the environment. Typical values of k are between 3 and 8.

Both the availability models and the data summaries (and potentially other information) may be replicated (as described above), where these have average sizes a and h respectively. In an example h is the total compressed size per endsystem of the data summary metadata, e.g. the histograms on all indexed attributes (e.g. in an example there may be five such histograms per endsystem). Each available endsystem may proactively push its data summary to its replicas p times per second, at a bandwidth cost of $f_{on}Nkph$, where N is the total number of endsystems within the system and $f_{on}$ is the fraction of all the endsystems which are, on average, available. Additionally, in this example, the system incurs the cost of replicating both availability models and data summaries whenever an endsystem joins or leaves the system. When an endsystem joins the system, the joiner must acquire all the metadata that it will be responsible for. When an endsystem leaves the system, the metadata held by the leaving endsystem must be re-replicated on some other endsystem. Since each endsystem has h+a bytes of metadata on average which must be replicated k times, the total amount of replicated data is Nk(h+a). This metadata must be replicated on the available nodes, thus each available node will store on average $$\frac{1}{f_{on}}k(h+a)$$

bytes. These bytes must be transferred on each churn event, consuming a bandwidth of $$\frac{1}{f_{on}}Nck(h+a),$$

where c, the churn rate, is the average rate at which any single endsystem switches between available and unavailable. Thus the total maintenance overhead for the system is $$f_{on}Nkph+\frac{1}{f_{on}}Nck(h+a)$$

The overhead within the system described herein is considerably less than for a centralized system where all available endsystem data is copied to a single central repository in order that it can be queried. In such a centralized system, the corresponding overhead would be $f_{on}Nd$, where d is the average amount of data stored by each endsystem. Typically the amount of data stored on an endsystem, d, will be much larger (e.g. orders of magnitude larger) than the metadata h+a (e.g. each endsystem may have a few GB of data stored locally, whilst the metadata may be a few KB in size). As a result, a centralized system will have an overhead which is correspondingly much larger than the query system described herein. As the overhead in the query infrastructure described herein is low and does not increase with database size, this query infrastructure is a more scalable approach than the centralized system. The overhead in the scalable query infrastructure described herein may be significantly reduced by using a form of delta encoding between successive histogram versions and/or by using compression techniques.

In addition to or instead of replicating metadata between end systems, selective portions of the data (e.g. views) stored locally at each endsystem may be replicated to a number of other end systems. The end systems to which this selective data is replicated may be selected in the same way as the replica set for the metadata as described above or the endsystems may be selected in a similar or different manner. For example, selective data may be replicated to a number of endsystems which are geographically located close to the particular endsystem. By selecting endsystems which are closely located in geography or in terms of network topology the selective data does not need to traverse far across the network and therefore does not contribute significantly to overall network congestion. The use of this replicated selective data is described below. The size of a replica set for the replication of selected data may be different to or the same as the size of the replica set for the metadata (k+1) and the size of the replica set for the results (m+1, as described below with reference to FIG. 12). The size of the replica set may also vary in a similar manner to the other replica sets described herein, e.g. according to failure rate, data type, data importance etc.

Having replicated metadata from each endsystem at a number of other endsystems (i.e. those endsystems within the replica set), the replicated metadata may be used in responding to queries on all the data in the system, i.e. on all the data stored at each of the endsystems 101 within the system 100 as shown in FIG. 1. As described below, the metadata may be used to provide an estimate of the completeness of a response to a query and/or to provide a prediction of when the response to the query may be complete even when a proportion of the endsystems may be currently unavailable. In some examples, the metadata may also be used to generate an approximate answer to a query when the full data is unavailable.

Figure 5:
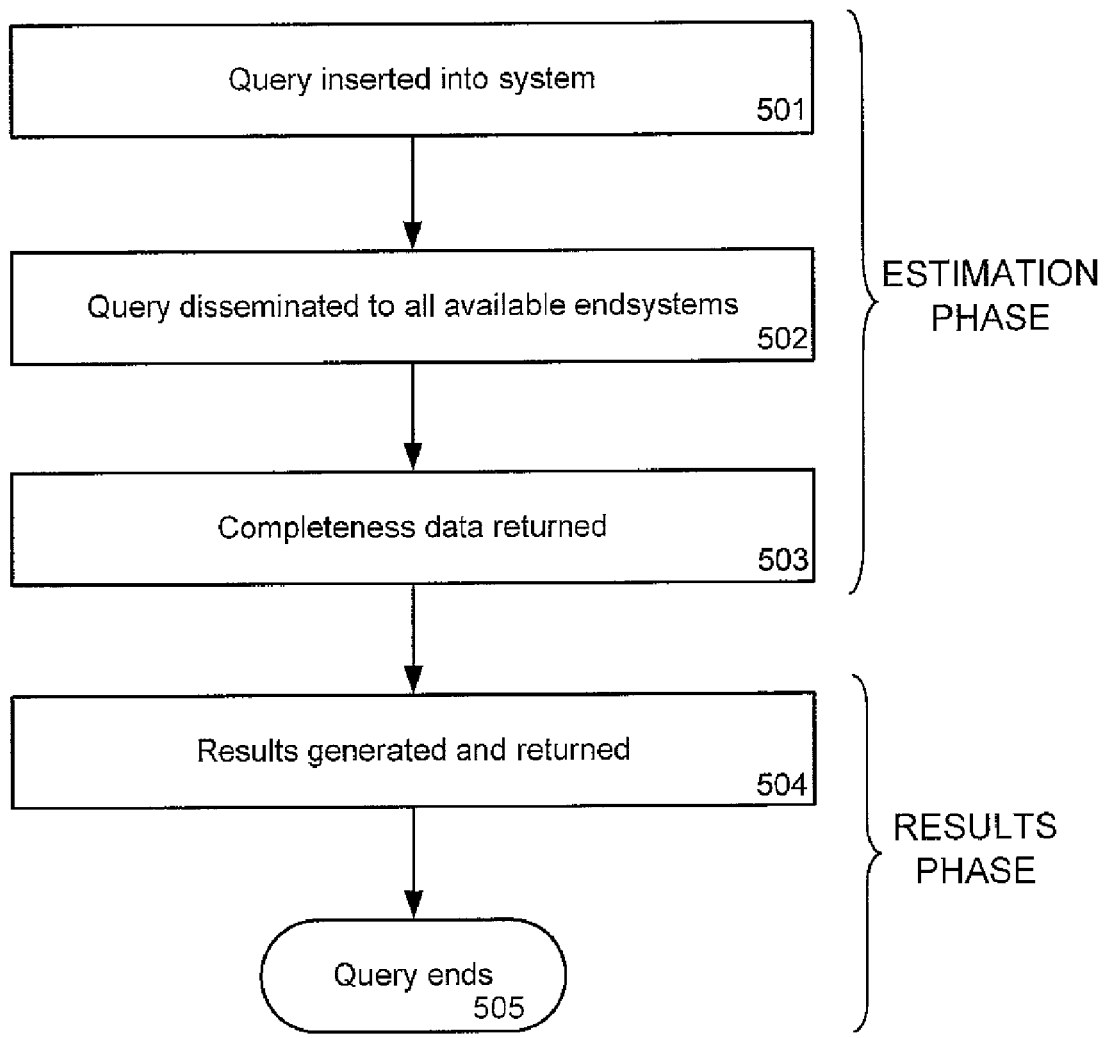
FIG. 5 shows an example flow diagram of a method of querying a large distributed dataset.

FIG. 5 shows an example flow diagram of a method of querying a large distributed dataset (as shown in FIG. 1) which comprises two phases: an estimation phase (steps 501-503) and a results phase (steps 504-505). In the estimation phase, a query is inserted into the system (step 501) and disseminated to all of the available endsystems within the system (step 502). As part of this dissemination process, some (or all) of the available endsystems are allocated responsibility for providing data on particular unavailable endsystems for which they already hold the metadata. Each available endsystem provides completeness data relating to itself and any unavailable endsystems for which it is made responsible (step 503) and generates results in response to the query based on the data held at that endsystem (step 504). As unavailable endsystems become available, they proceed to generate results in response to the query until the query ends (step 505) as it is complete, cancelled or has timed out. The different phases and steps are described in more detail below.

As described in more detail below, the completeness data may comprise a completeness estimate and/or a completeness predictor and may be based on one or more of: the amount of relevant data currently available, the total amount of relevant data, and the amount of relevant data expected to be available at various time points in the future. The "amount of relevant data" can be measured in different ways; for example, for relational data and queries, it may be measured as the "estimated number of rows that match query predicates".

By providing a completeness data (an estimate and/or a prediction, as described below) in response to any query inserted into the system, the method provides the query issuer (e.g. a user or a system which is built on top of the query infrastructure) with an explicit trade-off between the completeness of the query result and the delay in obtaining the result.

Figure 6A:
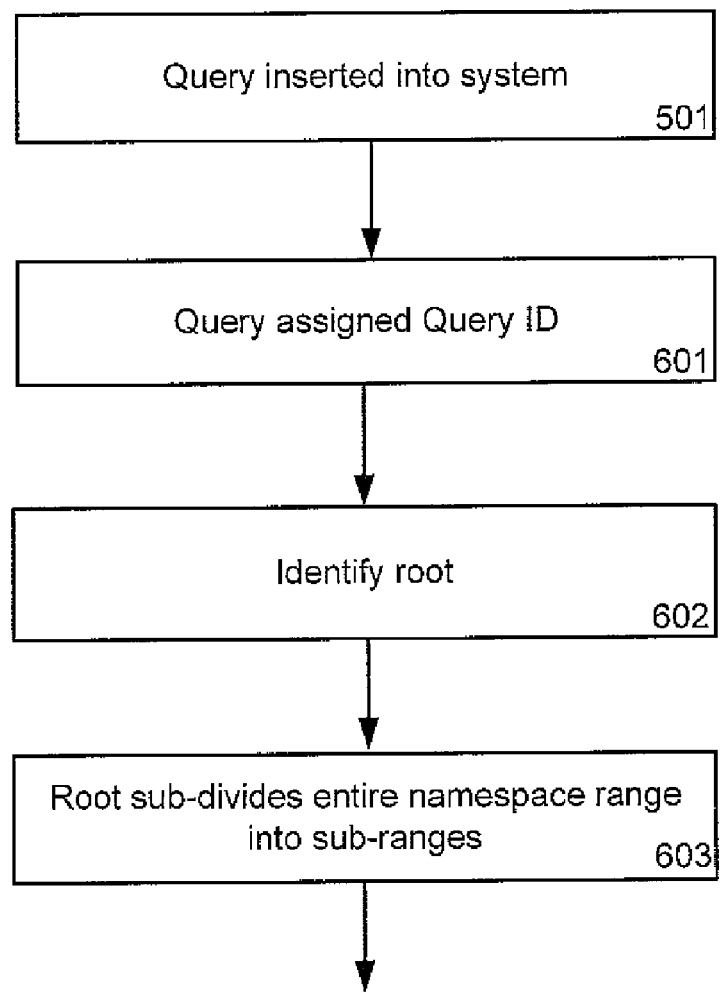
FIGS. 6A and 6B show an example of the estimation phase of FIG. 5 in more detail.
Figure 6B:
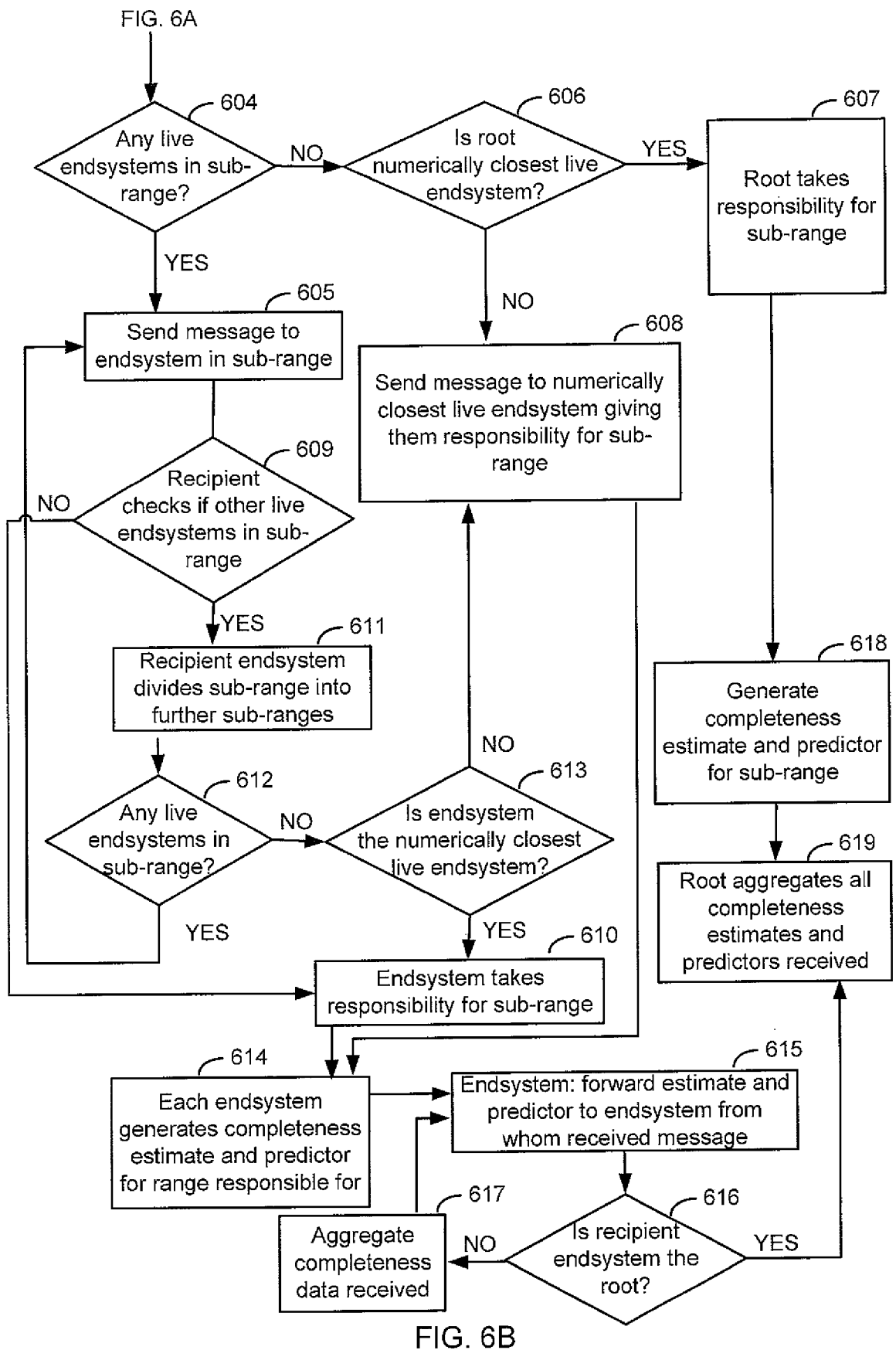

FIGS. 6A and 6B show the estimation phase in more detail. When a query is inserted into the system by the application layer on any endsystem (step 501) the query is assigned a key (step 601). The key, referred to as the query ID, may comprise the hash of the query. Hash functions map a large block of information, b, to an output h(b) typically of much smaller size. The hash function has the property that given a block b, it is computationally infeasible to find another block, b', with the same hash value, i.e. where h(b)=h(b'). Suitable hash functions for use in generation of a key include SHA-1 (Secure Hash Algorithm-1), SHA-2, MD4 (Message Digest 4) and MD5. These hash functions are particularly effective in producing unique hashes where the original blocks of information are similar. More traditional hash functions (e.g. CRC32, a cyclic redundancy check algorithm) may be used; however, these may result in more collisions (i.e. non-unique hash values).

Figure 7:
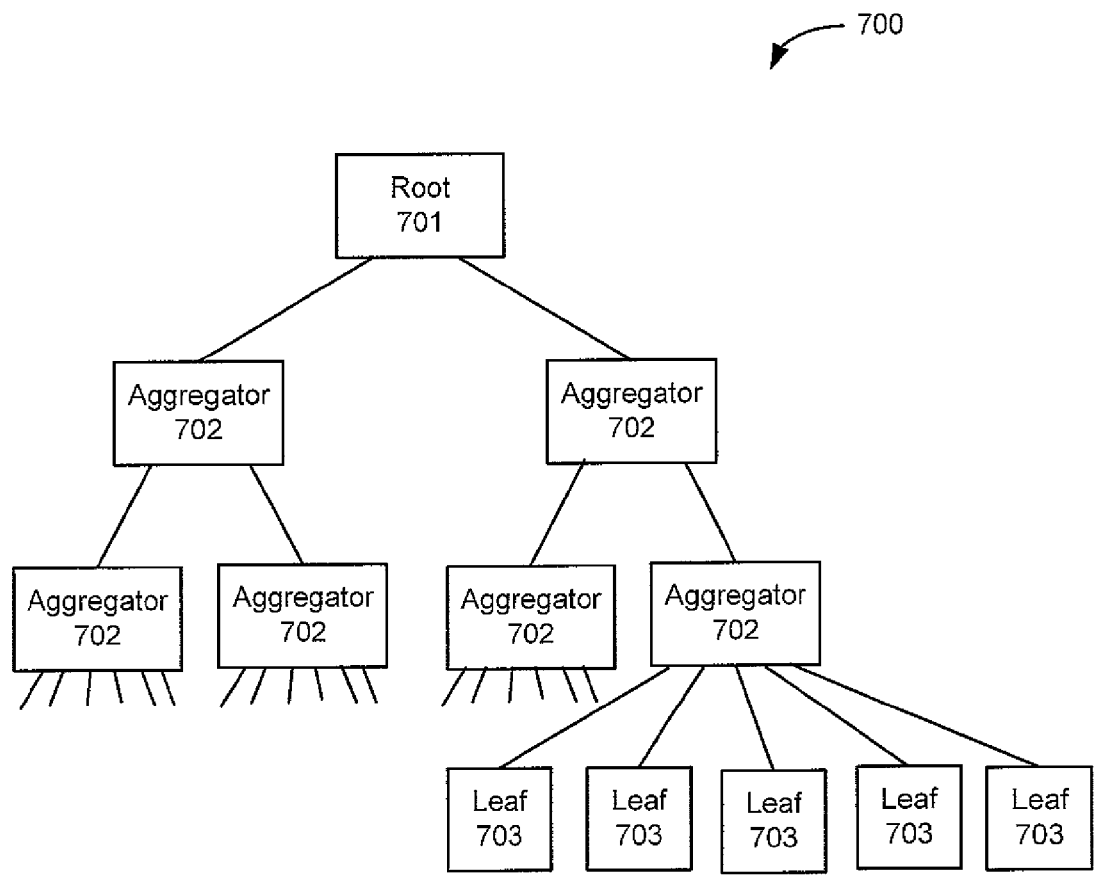
FIG. 7 shows a schematic diagram of an example application-level tree.

In order to disseminate the query to all available endsystems (step 502 of FIG. 5) and collate the results (step 503 of FIG. 5), an application-level tree is dynamically built (steps 602-613). FIG. 7 shows a schematic diagram of an example application-level tree 700 which comprises three logical types of nodes: the root 701, aggregators 702 and leaves 703. The root 701 is an endsystem which forms the root of the query distribution tree 700. An aggregator 702 is an interior node in the tree which both forwards queries towards the leaves 703 and aggregates data received from the leaves and forwards it towards the root 701. The completeness predictions are generated at the leaves 703. It will be appreciated that all available endsystems will be leaves 703 within the query distribution tree 700 whilst some of the endsystems will also logically be an aggregator 702 and one of the endsystems will also logically be the root 701. For the purposes of explanation, creation of a binary tree is described below, although it will be appreciated that the tree may have an alternative structure, such as a $2^b$-ary tree (where b is any number, typically b=4).

The creation of the tree begins with the identification of the root (step 602) which, in this example is the endsystem with the endsystem ID which is numerically closest to the query ID. Selecting the root based on the query ID, where the query ID is a hash of the query may be beneficial in situations where the query may be re-executed. If the result of a query is stored at the root, when a query is re-executed the same query ID may be allocated (because the hash is deterministic) and therefore the same root identified. It may then be possible to choose to answer the query from the cache rather than re-executing the query (e.g. if the elapsed time since the query was executed does not exceed a threshold value). In another example, the root may be identified by generating another hash of the query using a different hash function.

In other examples the root may be identified by other means, for example the root may be the endsystem on which the query is inserted or the same root may be used for all queries. Use of the endsystem where the query is inserted as the root may result in some network and/or endsystem congestion where many queries (e.g. most queries) are initiated via a single (or a small number of) endsystems (e.g. a terminal which is used by a network operator for network management purposes). Network and/or endsystem congestion may also result where an endsystem is used as the root for all queries.

Where the root endsystem is identified based on a hash of the query (either via the query ID or through a separate calculation), the hash function may be selected to perform load balancing within the system. For example in a datacenter, one might wish to constrain query insertion to be to particular designated machines installed for that purpose (since other machines might all be busy servicing the customers of the datacenter) and a hash function may be selected to meet such requirements. In another situation, one might wish to constrain the trees that are built by using appropriate hash functions, for example, where one has detailed knowledge of the structure of the underlying network (e.g. in a datacenter).

Once the root is identified (in step 602), the root then initiates the broadcast of the query using a 'divide and conquer' approach. The root sub-divides the entire namespace into a number of sub-ranges (step 603). These sub-ranges may be equal in size or may be of different sizes (and may also be referred to as 'ranges' instead of 'sub-ranges'). The root determines whether there are any available (also referred to as 'live') endsystems in each of the sub-ranges (step 604) and if so, sends a message to an endsystem in each sub-range (step 605). The message sent (in step 605) contains details of the sub-range in question and may also contain details of the query. The root may select an endsystem within each sub-range to send a message to (in step 605) by any suitable method and two different examples are described below with reference to FIGS. 8-11. It will be appreciated that the root will fall within one of the two sub-ranges and the root may therefore choose itself as the available endsystem in that sub-range and therefore a message to itself may not need to be sent (in step 605). Overlay routing tables held at endsystems may also be used in the selection of an endsystem to communicate with and an example of use of routing tables is also described below.

For large systems and where the entire range is divided into a relatively small number of sub-ranges (e.g. two sub-ranges in the examples provided below), it is unlikely that the root will find (in step 604) that there are no available endsystems in a particular sub-range. However, if such a sub-range with no available endsystems is identified (in step 604), the root determines whether it is the numerically closest (in ID space) available endsystem to the sub-range (step 606) and if so the root takes responsibility for that sub-range (step 607). However, if the root is not the numerically closest available endsystem to the sub-range (as determined in step 606), the root sends a message to the numerically closest available endsystem allocating that endsystem the responsibility for the particular sub-range containing no available endsystems (step 608).

Each endsystem which receives a message from the root (sent in step 605, referred to as the 'recipient endsystem') relating to a sub-range that the recipient endsystem is within, determines whether it is the only available endsystem within that sub-range (step 609) and if it is, the recipient endsystem takes responsibility for that sub-range (step 610). If however there are other available endsystems within the sub-range (determined in step 609), the recipient endsystem divides the sub-range into further sub-ranges (step 611), e.g. for a binary tree each recipient endsystem divides the sub-range into two further sub-ranges as shown in the examples of FIGS. 8-11. The recipient endsystem then determines whether there are any available endsystems in each of the further sub-ranges (step 612) and if so, sends a message to an available endsystem within each further sub-range (step 605). As described above, one of these messages may, in some examples, be sent by the endsystem to itself or may be logically be sent to itself without requiring any message to actually be sent. If the endsystem determines that there are no available endsystems in one or more of the further sub-ranges (determined in step 612), the endsystem determines whether, for that sub-range with no available endsystems, it is the numerically closest available endsystem (step 613). If the recipient endsystem is the numerically closest available endsystem, the recipient endsystem takes responsibility for the sub-range (step 610) but if it is not the numerically closest available endsystem, the recipient endsystem sends a message to the numerically closest available endsystem allocating that endsystem the responsibility for the particular sub-range containing no available endsystems (step 608).

The process (steps 605, 608-613) is repeated by each endsystem which receives a message from another endsystem (sent in step 605) detailing a particular sub-range until the entire namespace is allocated to an available endsystem which is either the only available endsystem in a particular sub-range (step 610) or the numerically closest available endsystem to a sub-range containing no available endsystems (step 608). By this process the distribution tree is built and the query is disseminated to all available endsystems (step 502).

Figure 8:
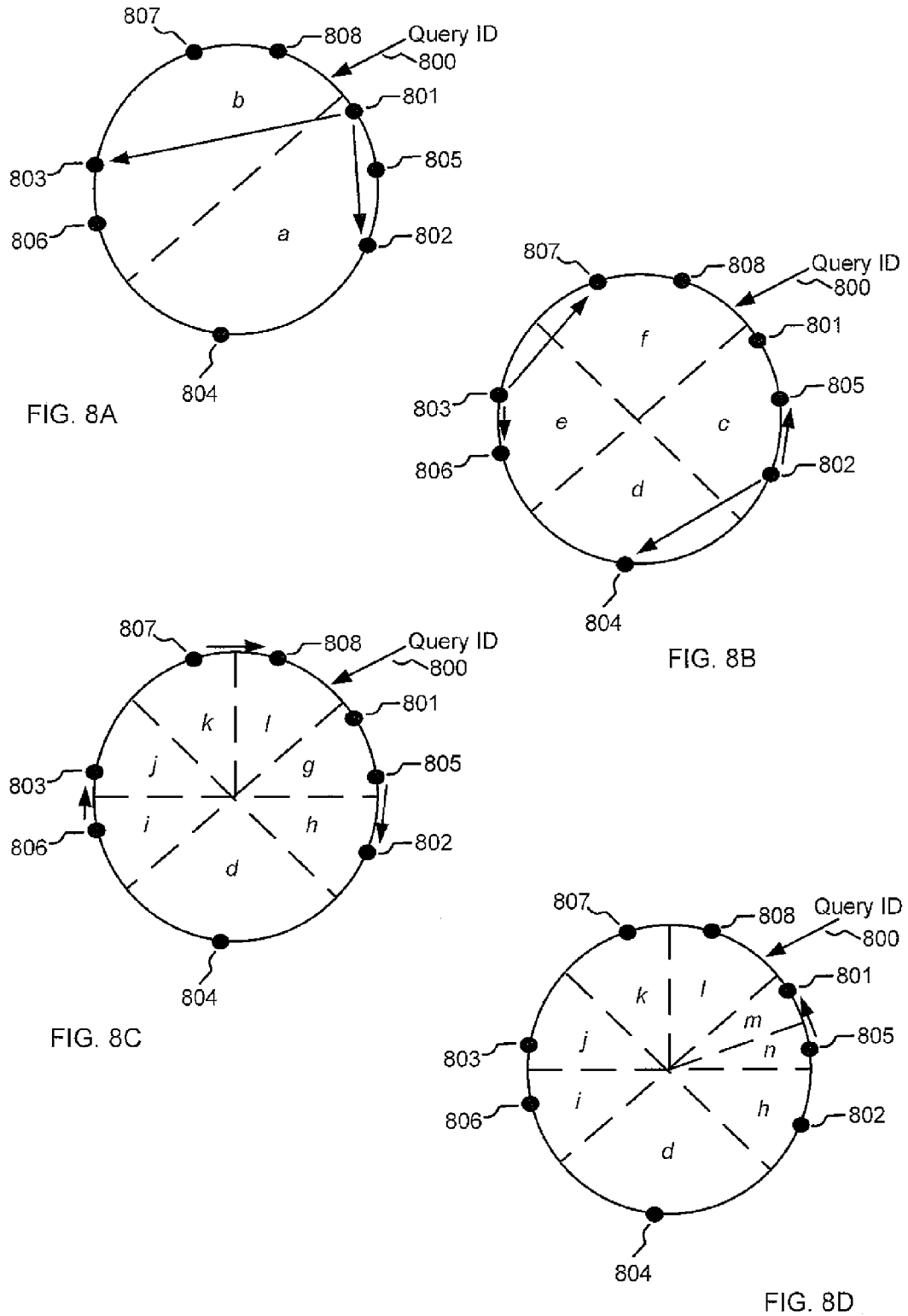
FIGS. 8A-8D and 9 show a first example of the creation of a distribution tree.
Figure 9:
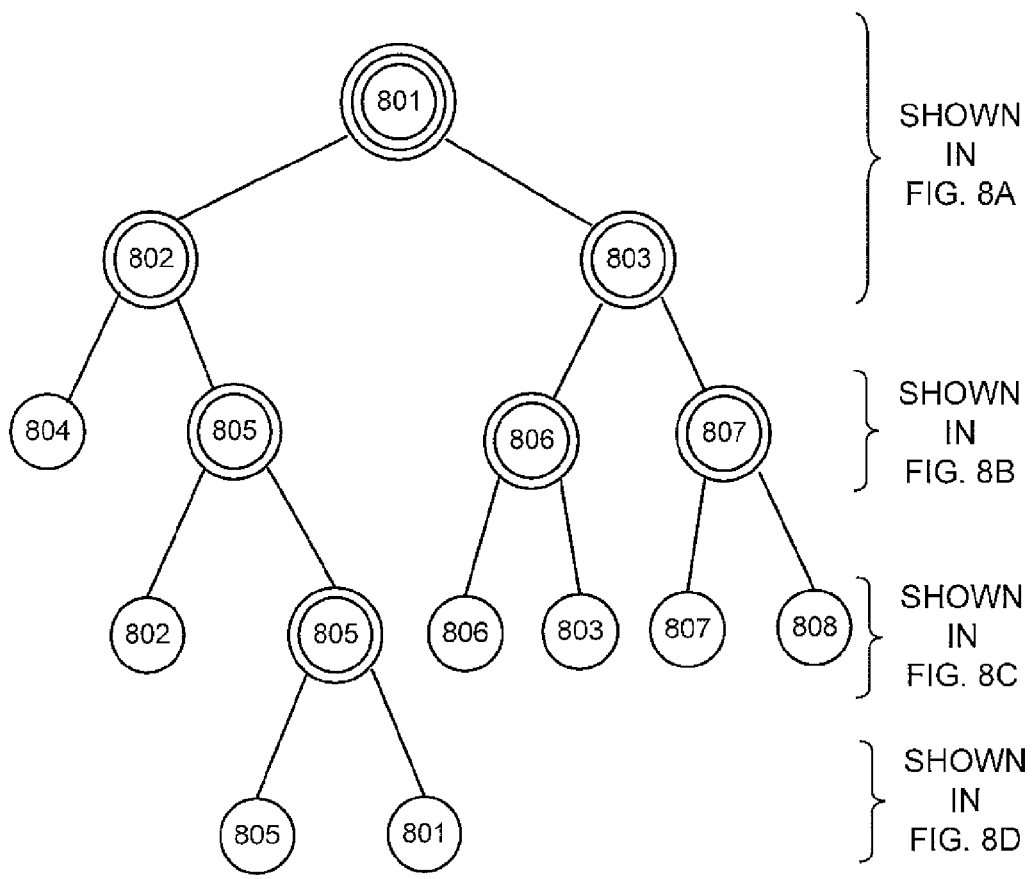

The process shown in steps 601-613 can be further described with reference to two examples shown in FIGS. 8-11. FIGS. 8 and 9 show a first example of the creation of a distribution tree in which FIGS. 8A-D show eight available endsystems 801-808 arranged around a circular namespace. The query is assigned a query ID 800 (step 601) which is closest (in ID space) to endsystem 801 and therefore endsystem 801 is identified as the root. The root 801 divides the namespace in two (into sub-ranges a and b, as shown by the dotted line) and sends a message (step 605) to the available endsystem within each sub-range which is closest to the midpoint of each sub-range, i.e. endsystems 802 and 803. Endsystem 802 determines that there are other available endsystems in sub-range a (step 609) and therefore divides sub-range a into two further sub-ranges, c and d (step 611 and as shown in FIG. 8B). Endsystem 802 then determines that there are available endsystems in both sub-ranges c and d (step 612) and therefore sends messages (step 605) to endsystems 804 and 805 which are each closest to the midpoint of one of the sub-ranges c and d. Similarly, endsystem 803 divides sub-range b into two sub-ranges e and f (step 611) and sends messages (step 605) to endsystems 806 and 807.

As the process is repeated (as shown in FIG. 8C) each recipient endsystem 804-807 determines whether there are any other available endsystems in the respective sub-range d, c, e, f (step 609). Endsystem 804 is the only available endsystem in sub-range d and therefore takes responsibility for that sub-range (step 610). Endsystems 805-807 are not the only available endsystems in sub-ranges c, e and f respectively and therefore each endsystem divides the particular sub-range into two further sub-ranges (c into g and h, e into i and j, f into k and l). The following messages are then sent:

805 to 802 (closest to the midpoint of sub-range h)
    806 to 803 (closest to the midpoint of sub-range j)
    807 to 808 (closest to the midpoint of sub-range l)

Endsystems 805-807 are themselves the closest available endsystems to the midpoints of sub-ranges g, i and k respectively and therefore messages may be sent to themselves (in step 605) or in other examples, no messages may be required.

The process is again repeated (as shown in FIG. 8D) with recipient endsystems 802, 803, 806-808 determining that they are the only available endsystems in their respective sub-ranges h, j, k, l, and therefore each endsystem takes responsibility for their sub-range (step 610). Endsystem 805 determines that there is another available endsystem and therefore divides the sub-range once more and sends a message to the available endpoint closest to the midpoint of sub-range m (endsystem 801). Finally, endsystems 801 and 805 determine that they are the only available endsystems in their sub-ranges m and n respectively and therefore take responsibility for their sub-range (step 610). A distribution tree, as shown in FIG. 9 has been built with endsystems 802, 803, 805-807 acting as aggregators (as indicated by the double circle around the endsystem number in FIG. 9).

Figure 10A:
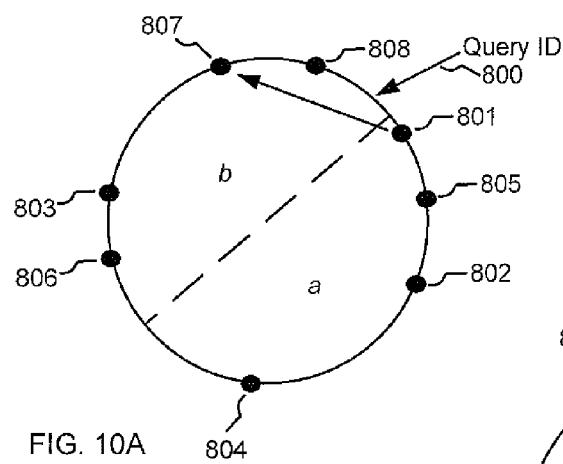
FIGS. 10A-10D and 11 show a second example of the creation of a distribution tree.
Figure 10B:
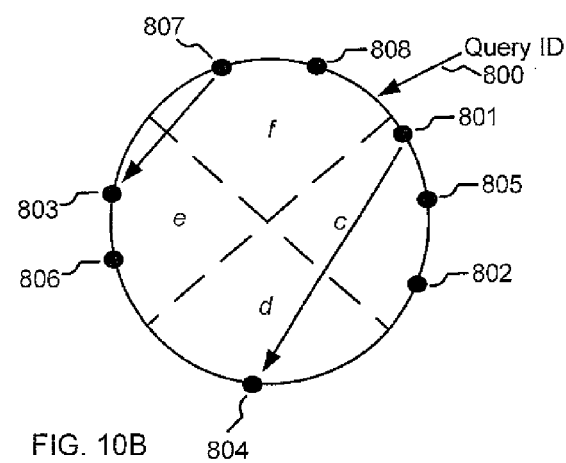
Figure 10C:
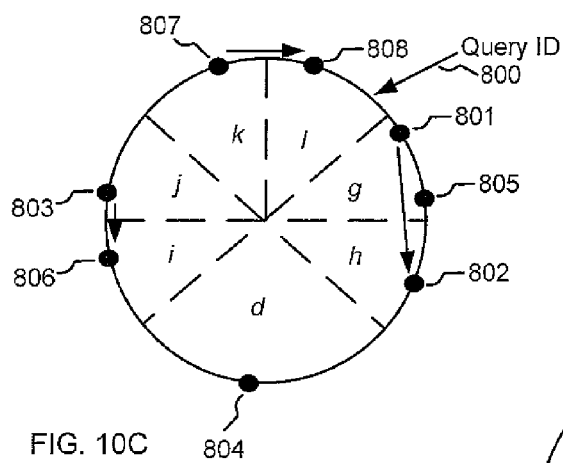
Figure 10D:
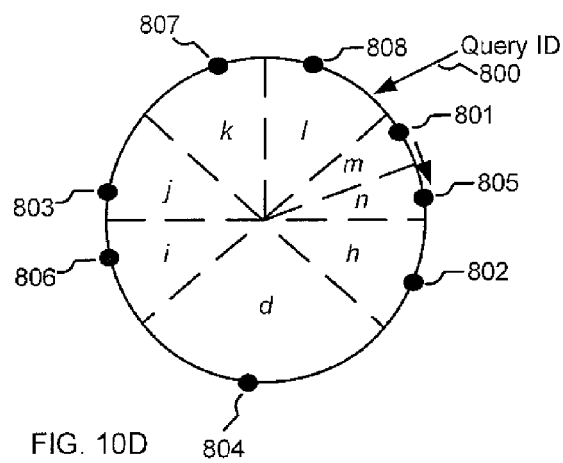
Figure 11:
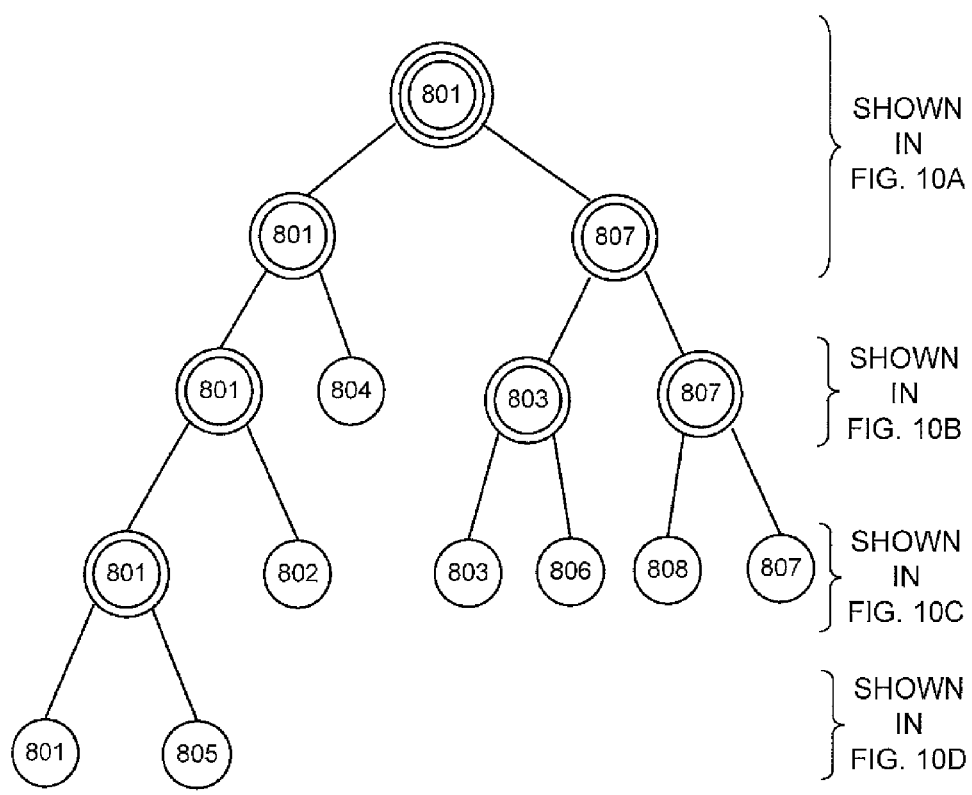

FIGS. 10 and 11 show a second example of the creation of a distribution tree in which FIGS. 10A-D show the same eight available endsystems 801-808 arranged around a circular namespace as previously shown in FIGS. 8A-D. The query is assigned as described above (step 601) and the distribution tree is built in a similar manner to that shown in FIGS. 8A-D and described above with the difference that when an endsystem (which may be the root) divides the range/sub-range and then sends messages to an available endsystem in each sub-range (step 605), the available endsystem to which the message is sent is selected in a different way. In the first example, messages were sent to the endsystems which were closest to the midpoints of each of the sub ranges, resulting in two messages (in this example which uses a binary tree) being sent across the network (e.g. from 801 to 802 and 803, as shown in FIG. 8A) unless the sending endsystem was already the closest endsystem to the midpoint of one of the sub-ranges (e.g. as shown in FIGS. 8C and 8D) in which case one message was sent to itself (or was not required to be sent at all). In the second example of FIGS. 10 and 11, however, one of the messages is, in all cases, sent to itself (or not sent at all and is not shown in FIGS. 10A-D) whilst the other message is sent to the available endsystem which is closest to the midpoint of the other sub range.

Initially the root 801 divides the range into two and sends a message to endsystem 807 (FIG. 10A). Endsystems 801 and 807 each divide the range into two sub-ranges and send messages to endsystems 804 and 803 respectively (FIG. 10B). Endsystem 804 determines that it is the only available endsystem in sub-range d, whilst endsystems 801, 803 and 807 each divide their sub-range and send out further messages to endsystems 802, 806 and 808 respectively (FIG. 10C). Endsystems 802, 803, 806-808 determine that they are the only available endsystems in their sub-ranges whilst endsystem 801 divides sub range g again and sends a message to endsystem 805 (FIG. 10D). The distribution tree, as shown in FIG. 11, is completed by the determination by endsystems 801 and 805 that they are the only available endsystems in their sub-ranges. In this example, only endsystems 801, 807 and 807 act as aggregators.

Whilst the two examples give the same end result in regard to the ranges of endsystems for which each available endsystem is responsible (as shown by comparison of FIGS. 8D and 10D), the distribution trees (shown in FIGS. 9 and 11) have a different structure.

The two examples described above show different methods by which the available endsystem to which the message is sent is selected. In another example, a routing table or structured overlay may be used and this is described in more detail below.

Although not shown in the examples described above, an endsystem may become responsible for more than one sub range, for example, an available endsystem will be allocated a sub-range for which it is the only available endsystem (in step 610) and it may, in some examples, also receive one or more messages (in step 608) relating to sub-ranges which the endsystem is not part of but for which the endsystem is the numerically closest available endsystem. For the purposes of the following description, each sub-range for which an endsystem is responsible for may be considered separately (e.g. separate estimates are generated and each estimate is sent to the specific parent for that sub-range). Where an endsystem is responsible for contiguous sub-ranges with the same parent, in some examples, the sub-ranges may be aggregated and a single estimate generated and sent to the parent.

The distribution tree which has been built (in steps 601-613, described above) is used both to disseminate the query (step 502) and to return completeness predictions (step 503), which completes the estimation phase. The query may be disseminated (step 502) at the same time that the tree is built by including the query in the messages sent between endsystems (steps 605 and 608) or may be disseminated separately once the tree has been built (e.g. after step 610, not shown in FIG. 6B).

As the distribution tree is built (in steps 601-613) without requiring manual configuration, there is a low user overhead and this provides an architecture which scales well as the number of endsystems within the system increases.

Once an endsystem has received the query and details of the sub range for which it is responsible (in steps 608 and/or 610), the endsystem generates a completeness estimate for the sub-range (step 614). The endsystem may also generate a completeness predictor for the sub-range (as shown in step 614). The completeness estimate and completeness predictor may be generated using the data stored at the endsystem. This data may include any metadata which has been replicated to the endsystem and which relates to currently unavailable endsystems. The completeness estimate is an estimate of the completeness of a response to the query if generated at that time (e.g. for t=0) whilst the completeness predictor provides a prediction of how this completeness is likely to change in the future (e.g. for t>0). The completeness estimate therefore may relate solely to the data stored at the endsystem and not information relating to unavailable endsystems because that information is not currently available to respond to the query. In examples where replication of selective data occurs between endsystems, the completeness estimate may also relate to that replicated selective data from unavailable endsystems. The completeness predictor, however, relates to data which is stored at unavailable endsystems and uses availability information relating to those unavailable endsystems (which may be included within the metadata) to predict when those endsystems may become available. The completeness estimate may be combined into the completeness predictor, with the completeness estimate corresponding to the predictor at the current time (e.g. at t=0). The completeness predictor may be in the form of a time line, a rate of change, a completion time etc.

The completeness estimate may be in the form of a fraction or percentage (e.g. 50%) whilst the predictor describes how this fraction or percentage is likely to change with time (e.g. 60% in 5 minutes, 90% in 10 minutes, 100% in 1 hour). In another example, the completeness estimate may be a measure of the amount of data available (e.g. 34 million rows, 50 MB, etc) whilst the predictor describes the change in amount of data (e.g. a cumulative value) or the additional data which is available (e.g. an incremental value). The completeness may be assessed based on any suitable metric, for example the proportion of the entire dataset which is available at that time (irrespective of whether the data is actually required to respond to the query) or the proportion of the entire dataset which is both available at that time and identified as relevant to the query. The complexity and accuracy of the completeness assessment is limited to an extent by the information in the metadata which has been replicated and which relates to the unavailable endsystems within the sub-range (i.e. if the data summary within the metadata only details how much data is stored at an unavailable endsystem, the completeness predictor can only be computed on this basis).

In an example, the completeness estimate may comprise a row count estimate generated by a local database management system at the endsystem. The completeness predictor may comprise a cumulative histogram of row counts against predicted time of availability, where the individual histograms of row counts for each unavailable endsystem are generated from the replicated metadata (e.g. from the data summary and the availability model as described above). The histograms may show time on a log scale to accommodate wide variations in availability from seconds to days (e.g. as a row-weighted log-latency histogram which details the numbers of rows available against time). The completeness predictor may take into consideration latency of query execution and/or load scheduling at the endsystem which is to provide the results for a particular portion of the entire dataset.

Having generated the estimate and predictor (in step 614), the endsystem forwards the data back up the distribution tree (e.g. as shown in FIGS. 7, 9 and 11) to the endsystem from whom it received the message (step 615), referred to as its 'parent'. The endsystem that receives the completeness data (sent in step 615) determines whether it is the root (step 616) and if it is not the root, it aggregates all the completeness data that it has received (step 617) and continues to forward the data up the distribution tree (step 615) to its parent. By aggregating the data at each step, the amount of data being transferred remains substantially constant. For example, using the distribution tree shown in FIG. 11, endsystem 807 may generate the following completeness data:

| | Time (hours) | | | | | |
|---|---|---|---|---|---|---|
| | 0 | 1 | 2 | 4 | 8 | 16 | 32 |
| Rows (millions) | 100 | 150 | 155 | 160 | 165 | 180 | 185 |

And endsystem 808 may generate the following completeness data:

| | Time (hours) | | | | | |
|---|---|---|---|---|---|---|
| | 0 | 1 | 2 | 4 | 8 | 16 | 32 |
| Rows (millions) | 150 | 190 | 190 | 195 | 205 | 205 | 205 |

Endsystem 807 receives the data from endsystem 808 (as the parent of endsystem 807) and therefore compiles the aggregated completeness data:

| | Time (hours) | | | | | |
|---|---|---|---|---|---|---|
| | 0 | 1 | 2 | 4 | 8 | 16 | 32 |
| Rows (millions) | 250 | 340 | 345 | 355 | 370 | 385 | 390 |

This aggregated data is then forwarded on to the parent (in this case which is also endsystem 807) to be aggregated with data from endsystem 803 before forwarding it to the root (endsystem 801).

This forwarding and aggregation process (steps 615-617) is repeated until the data has been received by the root, which may have had to generate its own completeness information for a sub-range for which it is responsible (step 618). The root then aggregates all the completeness data (e.g. both estimates and predictors where provided) that it has received (step 619). This aggregated data can then be provided in response to the query and this may enable a user to determine whether to continue with the query or to cancel it, or to provide them with an indication of when to expect the results etc.

The estimation phase (as shown in FIGS. 6A and 6B) may take a few seconds (e.g. 5-10 seconds) in a large system (e.g. a system of approximately 50,000 endsystems). During this time window, there is unlikely to be much churn within the network. However, if an endsystem to which a message has been sent becomes unavailable before it can respond with a completeness estimate or is unable to route messages to the parent (e.g. due to network congestion or failure), then the query may be re-distributed for the particular sub-range (i.e. the sub-range defined in the message sent to the endsystem which has now become unavailable). As described above, in some examples, periodic signals (also referred to as heartbeat signals) may be used to detect availability. In such an example, an endsystem may periodically send a signal to its parent. If an endsystem, having sent a message to a child endsystem, does not receive such a periodic signal or completeness data within a specified period, then the parent endsystem may reissue the query (e.g. by sending a new message to a different endsystem). This reissue of queries may be explained with reference to the example of FIGS. 10A-D and 11. If endsystem 803 became unavailable after the message had been sent to it (by endsystem 807, as shown in FIG. 10B) but before endsystem 803 had returned a completeness estimate and predictor to its parent, the parent (endsystem 807) would resend the message to another available endsystem within the sub range (sub-range e), in this case endsystem 806. As the only available endsystem in sub-range e, endsystem 806 would be responsible for the entire sub-range and would not sub-divide it.

Where a query is re-issued due to problems in communication between the parent and child (as described above), an endsystem may subsequently receive the same sub-range request from another parent. In such a situation, the endsystem processes each request it receives and provides the response (e.g. the completeness estimate) to the appropriate parent for that request.

Having generated the completeness estimate and predictor for the query in the estimation phase (steps 501-503), each available endsystem generates the result for the query based on the data at that endsystem and this data is aggregated using a result aggregation tree. The generation of this data may be automatic (e.g. once the completeness data has been provided to the endsystem's parent in the distribution tree) or may be initiated upon receipt of a trigger message. Whilst the same tree structure could be used for both the estimation and results phases, the tree structures have different requirements because of the timescales over which they are required to persist. The estimation phase takes a short period of time (such as a few seconds) whilst incremental result generation can take many hours as more endsystems become available. As churn over such a long time window may now be significant, a tree which is more resilient to failures and does not rely on re-transmission to the same extent as the query distribution tree described above, may be more suitable for the results phase.

Both the query distribution tree (described above) and the result aggregation tree (described below) provide "exactlyonce" semantics i.e. the trees ensure that no endsystem's estimate or final result will be double-counted. If an endsystem is available when the query reaches it then it will generate its own estimate and result. Otherwise with high probability there will be a metadata replica which will generate its estimate (and no more than one replica will do so) and the endsystem itself will contribute its result when it becomes available (unless the query is no longer live, because it has timed out, been cancelled etc).

Generation of a result aggregation tree may use a deterministic and converging function such that each endsystem in the tree computes the vertex ID of its parent. The function may be of the form:

f(query ID, endsystem ID)

where the function, f, defines a tree rooted at the query root or other defined point in the namespace. In another example, the function may be of the form:

f(query ID, endsystem ID, endsystem depth)

In further examples, the vertex ID of a child may be used instead of endsystem ID within the function to generate the vertex ID of its parent. Whilst the computed result of the function (the vertex ID) may not be equal to an endsystem ID, the value is mapped to the numerically closest available endsystem and this available endsystem is therefore identified as the parent. Whilst different functions may be used for different queries, the same function, f, is used for all the results for a particular query. The function may be defined within the system or may be communicated via the distribution tree (e.g. as part of or at the same time as the query or within the trigger message). The function is deterministic in that the result does not change with time, given the same inputs, and the function is converging in that all the results are mapped, through a number of iterations, back to a single point in the namespace. The function is such that for the same query ID, a number of endsystems are mapped to a single vertex ID (as the tree converges) whilst, in some examples, with the same endsystem ID, different queries (and which therefore have different query IDs) are mapped to different points. The function may be selected to uniformly distribute the load over the endsystems within a network, to map all queries to a single point (e.g. a tree of depth 1), to balance the load for a particular network structure (e.g. to minimize the number of messages between different subnets), or to achieve any other effect.

In some examples, endsystems at each level of the tree know which depth within the tree they are at (e.g. root has depth=0, children of the root have depth=1 etc). In one example, the depth may be communicated down the tree (e.g. with the query) and incremented at each level. In another example, an endsystem can determine its depth based on the longest prefix match between that endsystem's endsystem ID and the endsystem IDs of the closest left and right neighbors. This depth determination may be performed when the result aggregation tree is initially established and may then persist for the life of the result aggregation tree or may be recomputed periodically. The root endsystem is aware that it is the root (e.g. because the function will map back to itself).

The generation and returning of query results (step 504) can be described with reference to FIG. 12. An available endsystem generates results to a query (step 1201) and computes a vertex ID (step 1202), e.g. using a defined deterministic function as described above. The 'primary' parent endsystem is identified as the available endsystem which is numerically closest to this computed vertex ID (step 1203) and the results are forwarded to this primary parent endsystem (step 1204). On receipt of the results (step 1205), the primary endsystem replicates the received data to m other endsystems (step 1206), where m is an integer. A particular primary endsystem and the m other endsystems on which its results data is replicated as referred to as a 'replica set' (in a corresponding manner to the replica set described above with reference to the replication of metadata). The m members of the replica set may be selected in a corresponding manner to that described above, e.g. the m/2 neighboring endsystems clockwise in the namespace and the m/2 neighboring endsystems counter-clockwise in the namespace, or the m members may be selected using other parameters. As described above, in some examples, availability information (e.g. uptime information) may be used in the selection of suitable endsystems for the replica set. The size of the replica set (m+1) may be the same as that used for the metadata replication (k+1) or may be different (e.g. k=8 and m=3).

Once the primary endsystem has received acknowledgements from the other members of the replica set (step 1207), the primary endsystem sends an acknowledgement to the sender of the results (step 1208). At this point the sender may delete the results, if stored (not shown in FIG. 12). The primary endsystem updates a stored list of results received from each child (step 1209) such that should the sender try and resend the results they will not be double counted because the primary will know that they are the same as the results already received and stored in the list. The primary endsystem also computes a new aggregate result (step 1210). If the primary endsystem is not the root (determined in step 1211), the primary endsystem forwards the new aggregate result up the tree using the same process as used by the child (steps 1202-1210). Where the primary endsystem is the root (determined in step 1211), the new aggregate result is not forwarded to a parent but is stored and updated whenever new results are provided by endsystems within the result aggregation tree. The root may also maintain a completeness metric or other progress metric, which it updates when new results are provided. The progress metric may be updated based on information provided with the results e.g. data on the number of rows processed.

Figure 12:
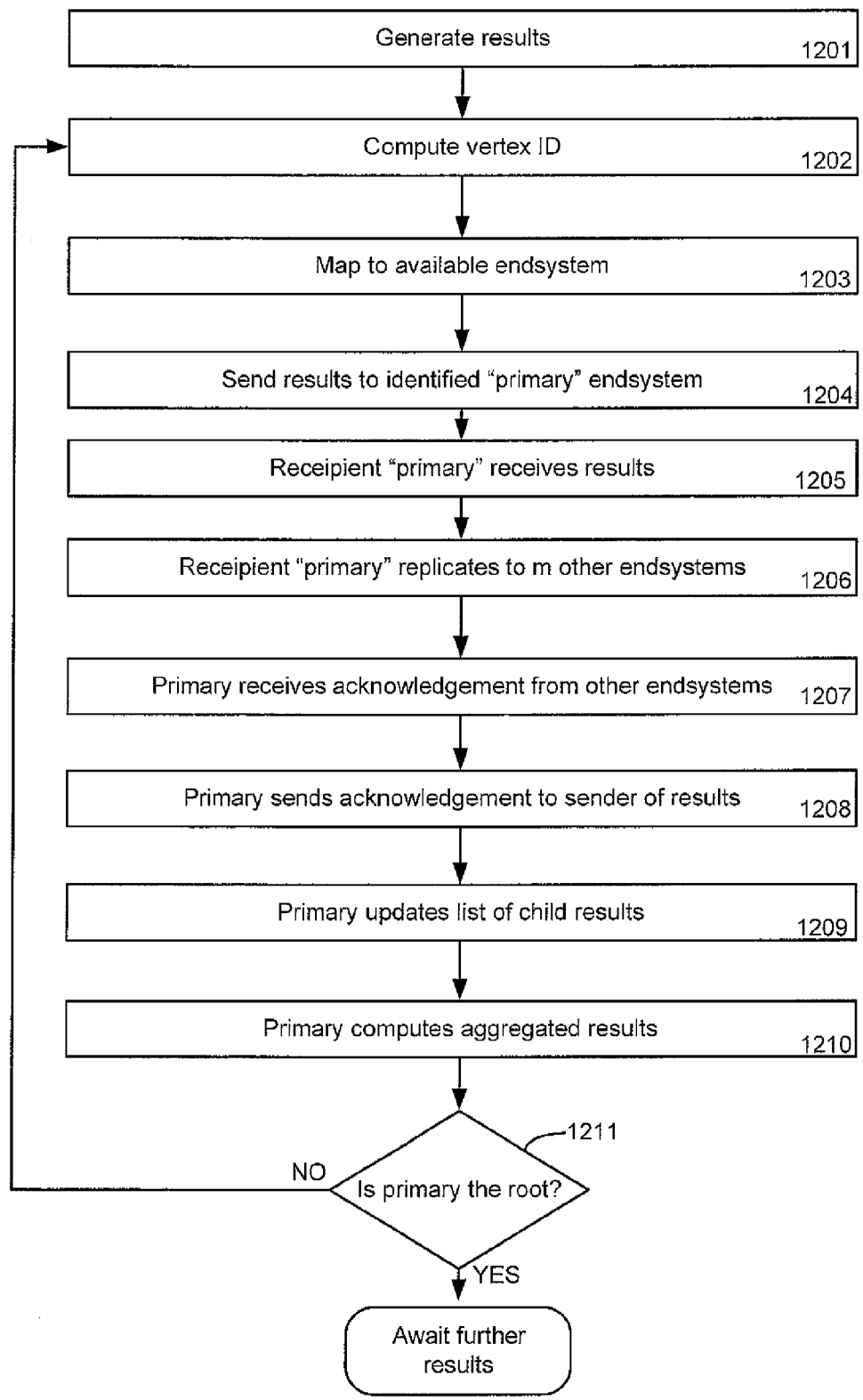
FIG. 12 shows an example of the step of generating and returning query results from FIG. 5 in more detail.

Having updated the list of child results (in step 1209) and computed the aggregate result (in step 1210), the list of child results, the child results versions and/or the aggregate result may be replicated to members of the primary endsystem's replica set (not shown in FIG. 12).

The results generated may be provided to the query originator by the root and for long-running queries, partial results may be periodically provided to the query originator (e.g. every time a new result arrives or every two hours etc). Progress data (such as the progress metric) may be provided with the results or partial results, where this information is available. In another example, the results may only be provided to the query originator once the complete result has been computed. Where partial results are provided to the query originator, a completeness estimate may be provided with the partial results. This may allow a user to cancel a query once a certain proportion of the data (e.g. 90%) has been processed.

In another example method of generation and collection of query results (step 504), the root may not replicate the results received to other end systems (e.g. the method is as shown in FIG. 12 excluding steps 1206 and 1207 where the primary is the root).

If any member of a replica set fails (e.g. becomes unavailable), the results may be replicated by the primary endsystem to another endsystem which therefore joins the replica set. If the primary endsystem becomes unavailable, a new primary may be identified which is the available endsystem which is numerically closest to the vertex ID. As described above, if an endsystem becomes available which is a more suitable member of the replica set (e.g. because its ID is closer to the primary endsystem or to the vertex ID), it may replace an existing member of the replica set. In a corresponding way, if a new member of the replica set is closer to the vertex ID than the existing primary endsystem, that closer endsystem may become the primary endsystem.

As described above, new endsystems may join a replica set to maintain the number of members of the replica set at m+1. However, in other examples, as described above in relation to the replica set for replication of metadata (of size k+1), the size of the replica set (or the value of m) may be defined in terms of a range, a target value, a maximum value, a minimum value etc. Furthermore, in some examples, the value of m may vary with time or according to the query type, the degree of churn within the network (e.g. increased for increasing churn), the importance of the results (e.g. increased for more important results), the size of the results (e.g., decreased for very large results sizes) etc. In an example, the value of m may be specified along with the query and disseminated to all the end systems.

As further endsystems become available, they receive details of active queries from members of their replica set (i.e. their set of k neighboring endsystems). This active query information may be sent with the metadata or separately. If a newly available endsystem has no record of answering an active query, it generates and submits its query result as shown in FIG. 12. As the query may be executed by endsystems over a long period of time (e.g. spanning many hours), the query may include a timestamp or information on the range of data to which the query is to be applied. The query may then be executed on the data that was held at the endsystem as at the time/date detailed in the timestamp or may be executed upon the specified range of data.

By maintaining a list of child results received at each level within the aggregation tree, the root does not need to maintain a list of all endsystems which have contributed to the query result. This reduces the amount of data which needs to be sent across the network, whilst still ensuring that results are counted only once from each endsystem. This also reduces the amount of data that needs to be stored at the root because the root does not need to maintain a list of endsystems which have responded. Such a list may be of a significant size where there are very large numbers of endsystems in the system.

Figure 13:
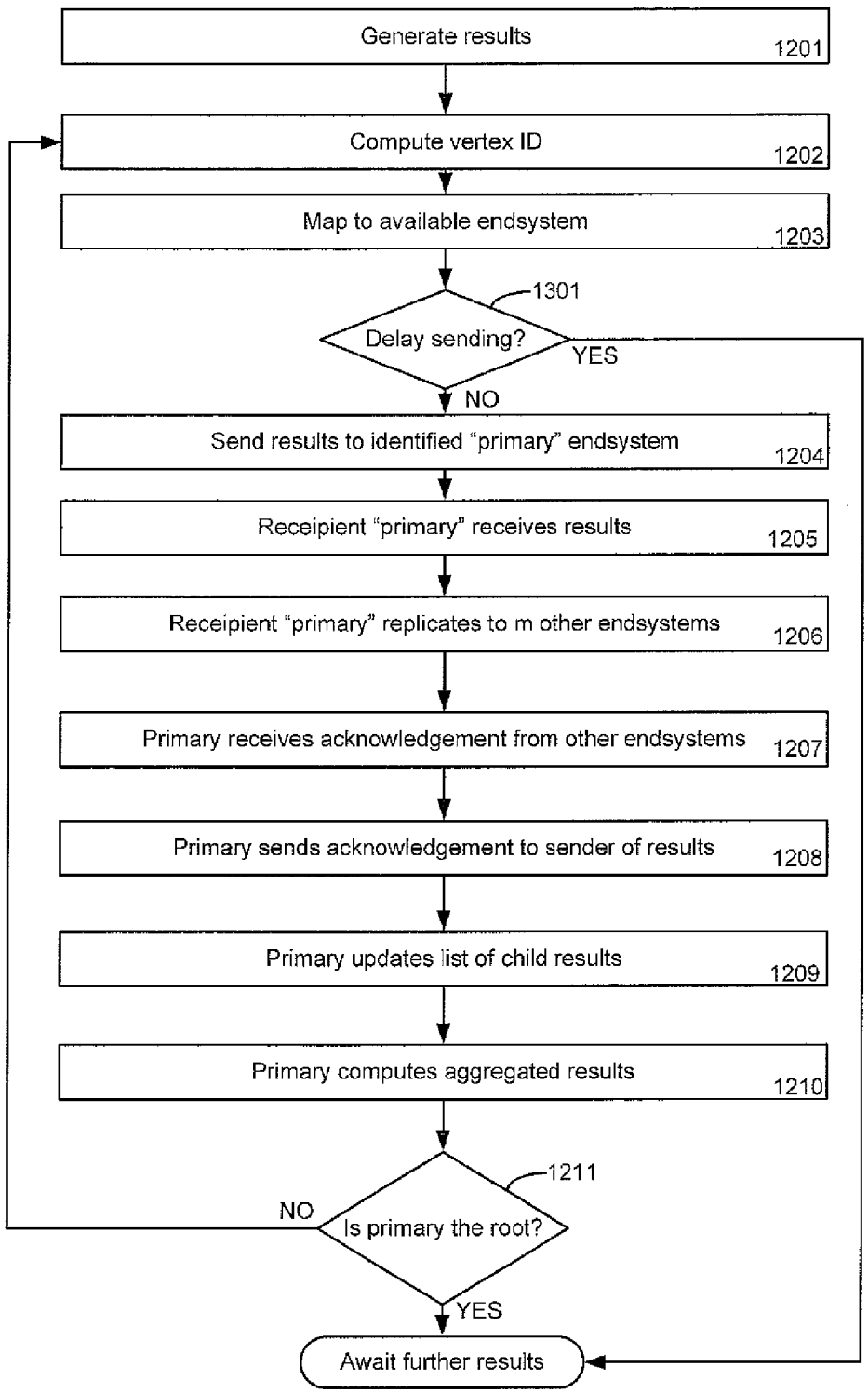
FIG. 13 shows a second example of the step of generating and returning query results from FIG. 5 in more detail.

In the above description, results received at an endsystem are aggregated (in step 1210) and sent to the identified primary parent endsystem for that particular endsystem (in step 1204) immediately they are received from a child. In another possible implementation, an endsystem may delay sending newly received results in the expectation that other results may arrive, as shown in FIG. 13 (step 1301). The decision taken regarding the delay (in step 1301) may be referred to as a 'batching decision'. This process may allow the endsystem to aggregate multiple child results before submitting them to its parent, thus saving network bandwidth. The extent of batching may be controlled by a periodic timer, or by a randomized timer, or based on the priority of the child result(s), or the number of child results as yet unsent, or the results' age, or some combination of the above, possibly using automatically selected limits and/or timeouts tuned for example by monitoring the aggregation performance and/or bandwidth consumed.

In the above description, the aggregated results are propagated up the result aggregation tree (in step 1204). However, in another example, only the difference in the aggregated results (e.g. the difference between the 'old' aggregate result and the 'new' aggregate result, computed in step 1210) may be transmitted up the result aggregation tree. In such an example the results may be replicated to m other endsystems (as in step 1206) or alternatively only the difference (i.e. the difference data received from a child endsystem) may be replicated to other endsystems.

Whilst in the above description the results are generated at each individual endsystem based on the locally generated and stored data at that endsystem, in some examples it may be possible to provide results for unavailable endsystems. Where selective amounts of data has been replicated between endsystems it may be possible for an available endsystem to respond and provide clear results on behalf of an unavailable end system for which it holds a selective portion of that unavailable endsystem's data. In such a system the generated results for the unavailable endsystem may be aggregated with the results of the available endsystem and transmitted up the results tree. In another example, the results generated by an available endsystem for an unavailable endsystem may be propagated up the tree independent of the available endsystem's own results. In such a situation the vertex ID may be generated (step 1202) once for the available endsystem for use in transmitting the available endsystem's results and a second vertex ID may be computed using the unavailable endsystem's ID in order to determine the primary endsystem to which the results for the unavailable endsystem should be transmitted. In such an example the completeness data may comprise an additional component relating to the amount of replicated data processed. For example, the completeness data may comprise measures of the amount of data accurately processed, the amount approximately processed (i.e. based on selectively replicated data), and the amount as yet unprocessed.

Having executed a query the results may be cached at the endsystem and/or any of the interior nodes in the results tree or alternatively the data may be discarded by some/all of the endsystems. By caching the query, performance may be improved if the query is repeated or a similar query is inserted into the system.

Once the results have been generated (step 504) the query ends (step 505). However the query may be cancelled prior to the generation of all the results, e.g. by means of a cancellation message propagated to all available endsystems (or all available endsystems that have not yet responded). The query may also have an associated expiry time such that it times out e.g. after 24 hours, 1 week etc.

The methods described above may be implemented using a distributed hash table (DHT). The DHT overlay structure may be used to enable failure resilient metadata replication, query dissemination and result aggregation. The query language used may be a subset of SQL or other SQL-like language.

The methods described above may be implemented on top of Pastry which is a scalable, self-organizing, structured overlay network. The overlay network ensures that any endsystem in the network has a path to a query's root node. In an example the Microsoft (trade mark) implementation of Pastry, MSPastry, may be used. MSPastry provides a DHT API (application program interface) which may be used for metadata replication and a lower level key based routing (KBR) API which may be used to build and maintain trees. MSPastry has low overhead and provides reliable message delivery even under adverse network conditions (e.g. high message loss rates and high overlay membership churn). The endsystems within Pastry have IDs which are 128 bits in length and may be considered to be a sequence of digits in base $2^b$, where b is a configuration parameter and typically b=4 and where the value of b may be the same as or different to the value of b described above in relation to query distribution tree formation.

In such an implementation, each endsystem maintains a routing table which may be used in the building of trees (e.g. to select an available endsystem within a particular subrange) and details of the IP addresses for the other endsystems in its 'leaf set'. Its leaf set comprises the L/2 numerically closest endsystems clockwise and the L/2 numerically closest endsystems counter clockwise in a circular namespace (which can alternatively be considered as the L/2 endsystems with endsystem IDs larger than the particular endsystem and the L/2 numerically closest endsystems with endsystem IDs smaller than the particular endsystem), where L is a configuration parameter (typically L=8). The k members of the replica set for replicating metadata and the m members of the replica set for replicating results may be chosen from an endsystem's leaf set. As a result, the replica messages may be routed in a single hop and therefore both network latency and network bandwidth usage are small. In such an implementation, message routing may be restricted such that messages can only be routed from an endsystem to members of its leaf set or to endsystems contained within its routing table. This minimizes the number of hops within the network that are required for transmission of messages and therefore improves the efficiency of the system.

Pastry is one example of a suitable overlay network which may be used. Other examples include CAN, Chord and Tapestry. Other implementations may use systems which provide the same (or similar) functionality as any of these overlay networks (e.g. a system referred to as Distributed Routing Table or DRT being developed by Microsoft (trade mark) which provides the functionality of Pastry).

Figure 14:
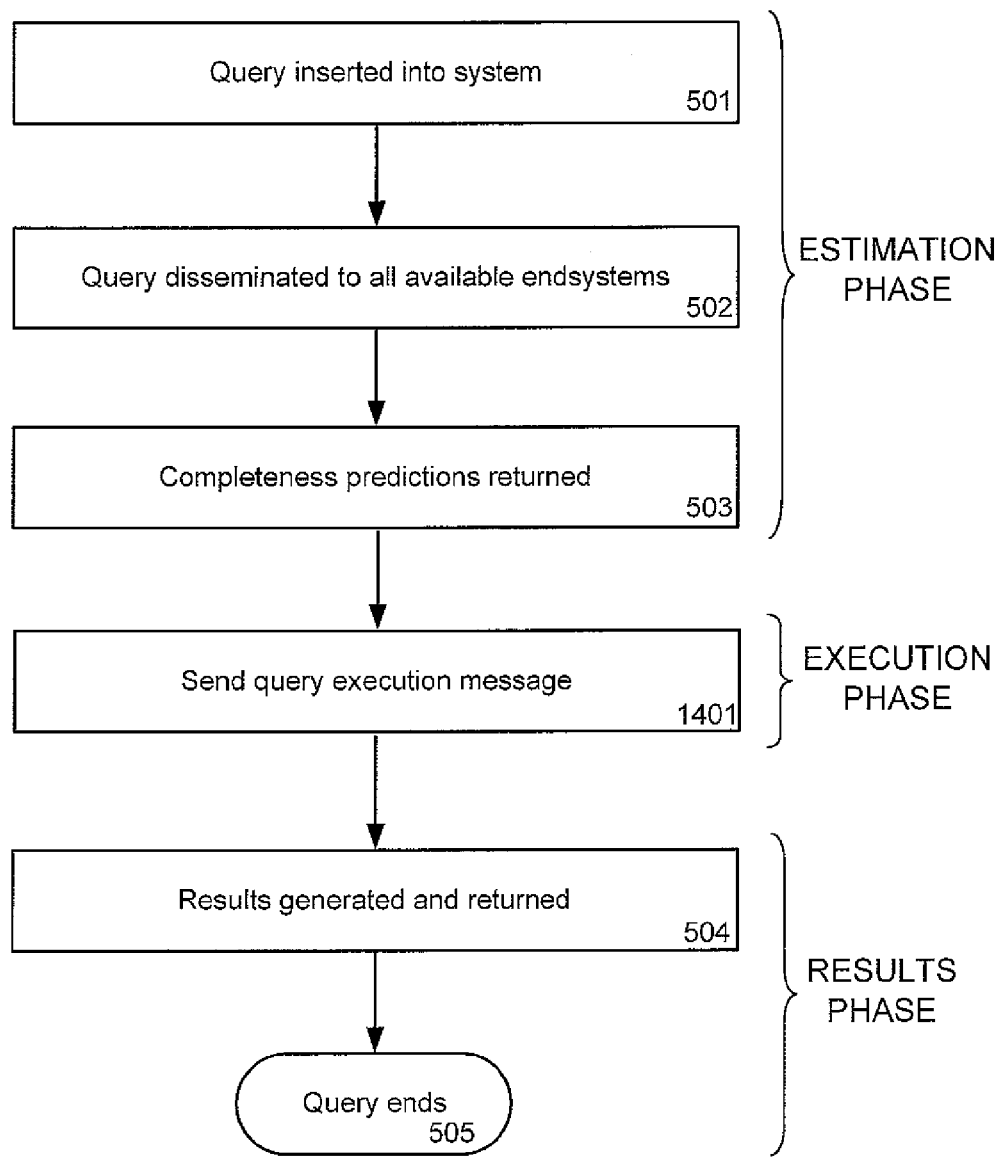
FIG. 14 shows a second example flow diagram of a method of querying a large distributed dataset.

The method of querying a large distributed dataset is described above in two phases: the estimation phase and the results phase, as shown in FIG. 5. In another example, the method may be divided into three phases: the estimation phase (also referred to as the planning phase), the execution phase and the results phase (also referred to as the aggregation phase), as shown in FIG. 14. The estimation phase (steps 501-503) is as described above, however, the results phase (steps 504-505) may not automatically follow but may instead only be triggered by the sending of a query execution message (step 1401) which causes the endsystems to generate and return the query results (step 504). The query execution message (sent in step 1401) may also be referred to as a trigger message. The trigger message may be distributed using the query distribution tree or alternatively a new tree may be built for distribution of the trigger message (e.g. using the same method as described above for the query distribution tree) and this new tree may be the same as or different to the query distribution tree used in the estimation phase.

The trigger message may contain details of the query or alternatively the trigger message may reference the earlier estimation phase, during which phase the endsystem may have stored the details of the query (e.g. following step 610 in FIG. 6B).

Use of a trigger message, as shown in FIG. 14, enables a user to decide whether, on the basis of the completeness data received, they wish to proceed with the query and if not, no trigger message is sent. For example, a user may not wish to proceed with a query if the completeness predictor indicates that only 50% of the dataset will be processed in the first 24 hours and that the user will have to wait for a further 72 hours before 80% of the dataset is likely to have been processed. If however, the endsystems proceed to generate results without the requirement for a trigger message (as shown in FIG. 5), results may be unnecessarily generated (using processor power at the endsystem) and sent up the result aggregation tree (using network bandwidth) for a query that the user may be about to cancel.

Use of a trigger message may be appropriate where the estimation phase is used to compare different query structures before determining which of the queries should be executed, as described in more detail below.

In the above description, the query is disseminated to all available endsystems and each available endsystem generates completeness data which it returns to the root using the query distribution tree. However, in some examples a distributed index may be used to route query messages (e.g. cost estimation requests and where implemented, query execution messages) to relevant parts of the distribution tree. The distributed index may specify, for a particular key, the endsystems with records in a particular range of key values, which enables the pruning of parts of the distribution tree with no data of interest to a particular query. In another example, the distributed index may specify, for a particular key, the endsystems with records relating to that key, which again enables pruning of the distribution tree. The distributed index may also specify the overall distribution of values for a particular key, which enables a row count estimate (or other form of completeness estimate) to be generated at the root for any query. In some examples a distributed index may be used just for pruning a distribution tree, whilst in other examples, the distributed index may be used for generating the estimate at the root in addition to (or instead of) using it to prune the distribution tree. In such an example, a query distribution tree may still be used to generate completeness data relating to the query.

A distributed index may be built by retrieving the data distribution histogram for each key of interest from each endsystem's database management system and propagating this information up a distribution tree (which may be the query distribution tree or a different tree). Each aggregator within the tree (see FIG. 7, also referred to as an interior node) merges the index structures from its child endsystems and sends the merged histogram to its parent. By merging the index structures, the amount of information transmitted up the tree is reduced. Each aggregator also stores the histograms received from child endsystems. These stored histograms may be used by the aggregator to route messages distributed from the root down through the tree (e.g. cost estimation requests and query execution messages) e.g. by only forwarding messages to child endsystems that have a non-zero row count matching a predicate of the query.

In an example, multiple distributed indexes may be built, each for a different attribute or set of predicates. For each query the system may pick one of the distributed indexes (e.g. the one judged to be most efficient) and propagate the query through via that index structure, while avoiding branches that do not satisfy the query predicates. Thus the chosen index and the query predicates together may induce a tree that delivers the query to all available endsystems with relevant data, although not necessarily to all available endsystems in the network.

The merging of the index information at the aggregator endsystems may use any suitable technique, such as Counting Bloom filters, Range-based histograms and Tries (prefix trees). Different techniques may be more suited to different kinds of key. A Bloom filter is a vector of cost values with each entry representing some set of key values. Filters are merged by summing the corresponding vectors. The vector length is a global tuning parameter. Bloom filters are particularly suited for point queries on discrete valued attributes, such as:

SELECT ... WHERE $port_{dst}$=80 OR $port_{dst}$=8000

Range-based histograms resemble traditional database histograms with slight modifications to allow conservative merging. They are particularly suited for range queries on continuous-valued attributes, such as:

SELECT ... WHERE bytes>20e20 AND bytes<40e20

Tries (prefix trees) are particularly suitable for string attributes and prefix queries and involve the reduction in Trie size by pruning at the leaves. A trie is a tree where interior nodes also represent values. Thus a path through the trie from the root to a leaf generates a sequence of values. If the values are characters, then the path generates a string, and the trie encodes a set of strings (one generated by each possible path). If the strings have prefixes in common, then they can share nodes in the trie near the root, hence tries are encoding of a set of strings that is efficient for answering "prefix queries" (or testing prefix predicates) of the form "WHERE appName BEGINS 'outlook'" or similar. Tries may be truncated at a particular depth in order to constrain their size and hence the bandwidth required to maintain them. Such truncation does not lead to incorrectness (i.e. not forwarding queries where they should be forwarded) but may lead to inefficiency (i.e. forwarding queries where they need not be forwarded), although since the data encoded in the trie reduces as one gets closer to the leaves of the distribution tree, it is possible that the query would still get stopped before actually being executed on leaf nodes).

The three example techniques described above (Counting Bloom filters, Range-based histograms and Tries) are all both efficient (e.g. they bound the index size as it propagates up the tree) and conservative (e.g. they reduce the likelihood of incorrect pruning of the tree).

Use of a distributed index, as described above, reduces the bandwidth consumed by plan dissemination and cost estimate aggregation which may be significant where there is a high query rate or where the system is extremely large.

In another example where the estimation phase is performed centrally the metadata may be replicated to a central point (or small number of points) by each endsystem within the system.

In some systems, the same data may be stored at more than one endsystem e.g. flow records for transmissions between endsystems such as web servers and web clients. As a result it may be possible to write a query in several different ways to obtain substantially the same information. Whilst the results returned may be the same, the time taken to obtain those results may differ according to the structure of the query used. For example, there may be a large number of web clients each of which is lightly loaded compared to a smaller number of busy web servers such that if the query is directed at the web servers there is a large latency before execution whilst if the query is directed at the web clients there is a smaller latency before execution. In another example, however, many of the web clients may be unavailable at any time whilst most of the web servers may be available at any time and the down time associated with any of the web servers may be much less than for a web client. As a result, if a query is directed at the web servers, rather than the web clients, the query results may be obtained more quickly. It will be appreciated that the situation may be much more complex than this and it may not be possible to predict at the query formulation stage the best approach for the query (e.g. to query the web servers or the web clients). Therefore a user may wish to obtain estimates for a number of different query strategies before deciding which query to actually run.

In order to compare a number of different query strategies, the estimation phase may be performed on each of the different queries to obtain completeness estimates (and completeness predictors, where provided) for each query (steps 501-503 of FIG. 5 or 14). A user, having received this completeness information, can compare the "costs" of the different query strategies and decide which query is required. For example, a query might have two plans. The histogram for the first plan may predict that 90% of the records will be processed after 4 seconds, but the remaining 10% will require a further 2 hours. The second plan may be expected to process 90% of the records after 10 minutes and the remaining 10% after 1 hour. Based on this information, a user may decide to execute the first query plan and then to terminate it with partial results after 5 seconds or alternatively to cancel it once 90% coverage has been obtained.

Where the estimation phase proceeds directly into the results phase (as shown in FIG. 5) the user may cancel the queries that are not required (causing the method to jump to step 505), whilst where a query execution message is required to initiate the generation of results, the user may trigger the sending of the query execution message for the selected query (step 1401, FIG. 14).

In the above examples, the different plans are assessed on the basis of a cost which is defined as the time required to process data (i.e. using the completeness predictor). In another example, other factors, such as endsystem loading or network bandwidth, may be used in addition to (or instead of) the time required. The network loading information may be included within the metadata (see above) and may be used in the generation of the completeness predictor, as described above. This loading information may be used separately to define cost metrics for execution of queries at each endsystem.

The query infrastructure and query methods described above may be used in many different applications and at many different scales. Suitable applications include management of large data centers (e.g. where systems record their usage, configuration etc), enterprise-scale endsystem and network management (e.g. where each endsystem in an enterprise locally generates data concerning its configuration, network usage, uptime, user profiles etc), Internet-scale distributed diagnostics (e.g. where process failure or machine crash information is generated on endsystems and stored locally), general distributed data processing, interactive data exploration, data mining and querying of sensor networks. In an example, when managing large data centers, operators may wish to query the load, the set of running services, the free disk space etc across a large number of machines for diagnostic purposes. In another example, an Internet-scale diagnostic tool may collect crash or other fault information from a large number of endsystems running a particular application or operating system.

Figure 15:
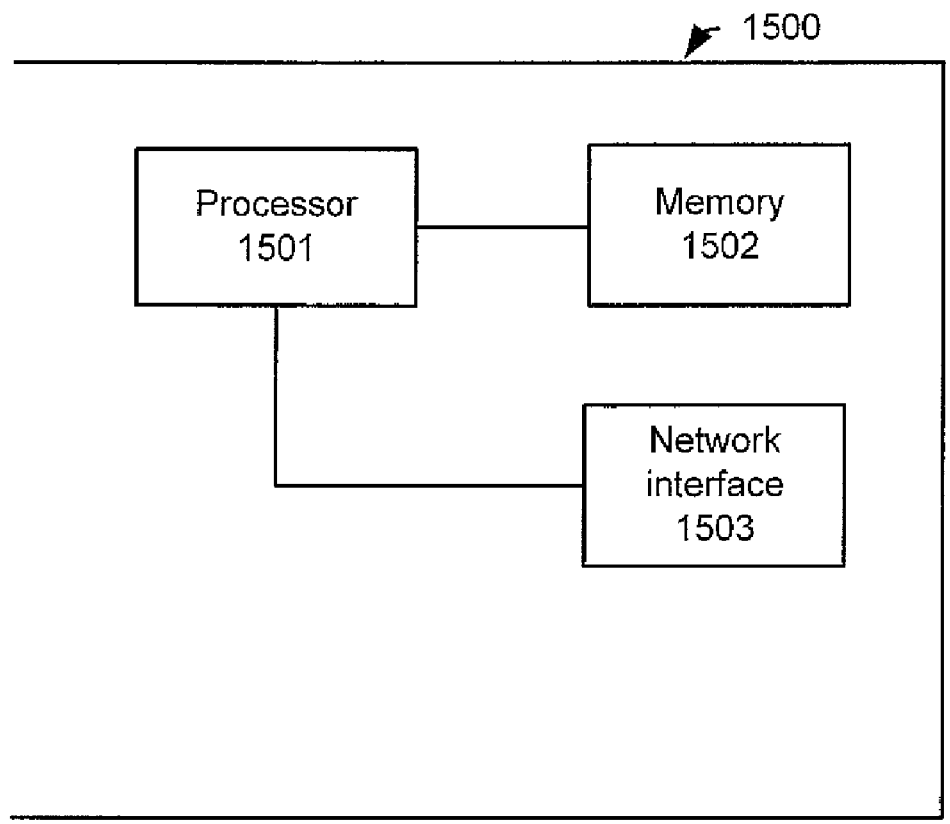
FIG. 15 shows a schematic diagram of an endsystem.

The methods, as described above, may be performed on an endsystem 1500, as shown in FIG. 15, comprising a processor 1501 and a memory 1502 and a network interface 1503. The memory 1502 is arranged to store executable instructions which, when executed, cause the processor to perform any or all of the method steps of any of the methods described above. The memory may also be used to store the local data or alternatively the endsystem may comprise a second memory (not shown in FIG. 15) for storage of the locally generated data. Alternatively, the locally stored data may be stored in a storage device which is external to the endsystem but accessible from the endsystem.

Although the present examples are described and illustrated herein as being implemented in an apparatus as described above and shown in FIG. 15, the system described is provided as an example and not a limitation. As those skilled in the art will appreciate, the present examples are suitable for application in a variety of different types of processing systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more device-readable media, wherein the one or more device-readable media is hardware, with device-executable instructions to perform acts comprising: receiving metadata at a first endsystem from a second endsystem; in response to receiving the metadata, storing the metadata at the first endsystem; receiving a message at the first endsystem from a remote endsystem, the message comprising a query and data identifying a range of endsystems, the range of endsystems including one or more available endsystems and one or more unavailable endsystems, generating completeness data to the query, the completeness data comprising: an estimate of completeness of a response to the query generated at an initial time for the available endsystems; and a prediction of changes in completeness of the response to the query over time, the prediction being based on availability information relating to the unavailable endsystems to predict when the unavailable endsystems are likely to become available, the availability information being the uptime information for the endsystem; and transmitting the completeness data for the range of endsystems to the remote endsystem.

2. One or more device-readable media according to claim 1, wherein the completeness estimate comprises a row count estimate, the row count estimate indicating a number of rows of data stored at the range of endsystems available for matching a predicate of the query.

3. One or more device-readable media according to claim 1, wherein the metadata comprises a summary of data stored at the second endsystem and availability data for the second endsystem.

4. One or more device-readable media according to claim 3, wherein the completeness predictor comprises a row-weighted log-latency histogram indicating a number of rows of data available for matching a predicate of the query over time.

5. One or more device-readable media according to claim 1, wherein the data stored at the first endsystem comprises data generated at the first endsystem and stored metadata.

6. One or more device-readable media according to claim 1, wherein the data stored at the first endsystem comprises metadata for the at least one unavailable endsystem.

7. One or more device-readable media according to claim 6, wherein the range of endsystems further comprises the first endsystem.

8. One or more device-readable media according to claim 1, wherein generating completeness data for the range of endsystems based on data stored at the first endsystem comprises:
   determining whether the range of endsystems comprises at least two available endsystems; and
   if the range comprises less than two available endsystems, generating completeness data for the range of endsystems based on data stored at the first endsystem; and
   if the range does comprise at least two available endsystems:
   dividing the range into a plurality of sub-ranges;
   sending a message to an available endsystem in each sub-range, the message comprising the query and data identifying the sub-range; and
   in response to receiving completeness data for each sub-range, storing the completeness data for each sub-range at the first endsystem and generating the completeness data for the range of endsystems based on data stored at the first endsystem.

9. One or more device-readable media according to claim 1, further comprising device-executable instructions to perform acts comprising:
- generating results data for the query based on the data stored at the first endsystem;
- identifying a recipient endsystem for the results using a predetermined function; and
- transmitting the results to the identified recipient endsystem.

10. One or more device-readable media according to claim 9, further comprising device-executable instructions to perform acts comprising:
- in response to receiving further results data from another endsystem:
- storing the further results data;
- aggregating the results data and the further results data; and
- transmitting the aggregated results to the identified recipient endsystem.

11. One or more device-readable media according to claim 10, further comprising device-executable instructions to perform acts comprising:
- selecting at least one endsystem from a plurality of endsystems; and
- replicating the further results data to each of the selected at least one endsystem.

12. One or more device-readable media, wherein the one or more device-readable media is hardware, with device-executable instructions to perform acts comprising: receiving a query at an endsystem of a plurality of endsystems, the endsystem creating a first query strategy and a second query strategy, each query strategy being based on the query and structured to obtain the same information using a unique query structure; determining by the endsystem, in response to receiving the query, a first range of endsystems of the plurality of endsystems according to the first query strategy; determining by the endsystem, in response to receiving the query, a second range of endsystems of the plurality of endsystems according to the second query strategy, the second range of endsystems being different from the first range of endsystems; providing, by the endsystem, first completeness information to a user of the endsystem based on first completeness data received from the first range of endsystems; providing, by the endsystem, second completeness information to the user of the endsystem based on second completeness data received from the second range of endsystems; and sending the query from the endsystem to the first range of endsystems in response to user input.

13. One or more device-readable media according to claim 12, wherein the first completeness information includes a first completeness estimate indicating an amount of completeness of a response to the query at a first time based on the first query strategy and a first completeness predictor indicating an amount of completeness of the response to the query at a plurality of subsequent times based on the first query strategy.

14. One or more device-readable media according to claim 13, wherein the plurality of endsystems are coupled to each other via a network, and wherein the first completeness information indicates an amount of bandwidth of the network utilized to complete at least a portion of a response to the query.

15. A method of querying a plurality of endsystems comprising:
- receiving a query at an endsystem of the plurality of endsystems, the endsystem configured to provide a response to the query based on data received from the plurality of endsystems;
- determining whether the endsystem has received input to send a query execution message to a range of endsystems of the plurality of endsystems, the query execution message indicating a request to provide a response to the query;
- disseminating the query execution message from the endsystem to the range of endsystems, the range of endsystems comprising available and unavailable endsystems within the plurality of endsystems; and
- generating a completeness estimator for available endsystems and a completeness predictor for unavailable endsystems based on completeness data received from a first subset of the plurality of endsystems according to a query distribution tree, the completeness estimator being an estimate of the completeness of a response to the query generated at an initial time, the completeness predictor being an estimate of how the completeness estimator will change over time from the initial time.

16. A method of querying a plurality of endsystems according to claim 15, wherein the response to the query is generated from results received from a second subset of the plurality of endsystems according to a result aggregation tree that is different from the query distribution tree.

17. A method of querying a plurality of endsystems according to claim 15, further comprising:
- receiving a request at the endsystem from the user of the endsystem to cancel generating results of the query before processing all of the data required to generate the results.

* * * * *